United States Patent
Inagaki et al.

(10) Patent No.: US 9,527,141 B2
(45) Date of Patent: Dec. 27, 2016

(54) NEGATIVE CUTTING INSERT, AND INDEXABLE ROTARY CUTTING TOOL, INDEXABLE ROTARY CUTTING TOOL SYSTEM AND CUTTING METHOD USING SUCH CUTTING INSERT

(75) Inventors: Fumihiko Inagaki, Narita (JP); Hisanori Mura, Narita (JP); Tomohiro Murata, Narita (JP)

(73) Assignee: Hitachi Tool Engineering, Ltd., Tokyo (JP)

( * ) Notice: Subject to any disclaimer, the term of this patent is extended or adjusted under 35 U.S.C. 154(b) by 378 days.

(21) Appl. No.: 14/232,035

(22) PCT Filed: Jun. 8, 2012

(86) PCT No.: PCT/JP2012/064782
§ 371 (c)(1),
(2), (4) Date: Jan. 10, 2014

(87) PCT Pub. No.: WO2013/008565
PCT Pub. Date: Jan. 17, 2013

(65) Prior Publication Data
US 2014/0161545 A1   Jun. 12, 2014

(30) Foreign Application Priority Data

Jul. 12, 2011 (JP) ................................. 2011-153527
Mar. 23, 2012 (JP) ................................. 2012-067716

(51) Int. Cl.
*B23C 5/20* (2006.01)
*B23B 27/16* (2006.01)
*B23C 5/06* (2006.01)

(52) U.S. Cl.
CPC ........... *B23C 5/202* (2013.01); *B23B 27/1603* (2013.01); *B23C 5/06* (2013.01); *B23C 2200/208* (2013.01);
(Continued)

(58) Field of Classification Search
CPC ...... B23C 5/202; B23C 5/06; B23C 2200/605; B23C 2200/208; B23C 2200/243; B23C 2200/326; B23C 2210/082; B23C 2210/168; B23C 2210/66; Y10T 407/1924; Y10T 407/23
See application file for complete search history.

(56) References Cited

U.S. PATENT DOCUMENTS 6,079,912 A   6/2000   Rothballer
6,543,970 B1  4/2003   Qvarth et al.
(Continued)

FOREIGN PATENT DOCUMENTS

EP   2412464 A1    2/2012
JP   2000-503912 A 4/2000
(Continued)

OTHER PUBLICATIONS

Communication dated Dec. 22, 2014 from the European Patent Office in counterpart application No. 12811426.1.

*Primary Examiner* — Sunil K Singh
*Assistant Examiner* — Alan Snyder
(74) *Attorney, Agent, or Firm* — Sughrue Mion, PLLC

(57) ABSTRACT

A negative cutting insert having a cutting edge comprising four long-side cutting edge portions for rough cutting and four short-side cutting edge portions for finish cutting, which are connected alternately, thereby being able to conduct rough cutting when attached to a rough-cutting tool body, and finish cutting when attached to a finish-cutting tool body. When such cutting inserts are used for rough or finish cutting and then reattached to a finish-cutting tool body or a rough-cutting tool body, finish or rough cutting can be conducted, thereby using all cutting edges thoroughly.

11 Claims, 15 Drawing Sheets

(52) U.S. Cl.
CPC .... *B23C 2200/243* (2013.01); *B23C 2200/326* (2013.01); *B23C 2210/082* (2013.01); *B23C 2210/168* (2013.01); *B23C 2210/66* (2013.01); *B23C 2220/605* (2013.01); *Y10T 407/1924* (2015.01); *Y10T 407/23* (2015.01); *Y10T 409/303752* (2015.01)

(56) References Cited

U.S. PATENT DOCUMENTS

| | | |
|---|---|---|
| 7,125,205 B2 | 10/2006 | Sheffler |
| 7,410,332 B2 | 8/2008 | Scherbarth |
| 8,328,472 B2 | 12/2012 | Choi et al. |
| 8,529,168 B2 | 9/2013 | Michelet et al. |
| 2004/0042858 A1 | 3/2004 | Sheffler |
| 2004/0218987 A1 | 11/2004 | Sheffler et al. |
| 2009/0285646 A1 | 11/2009 | Oprasic et al. |
| 2010/0150671 A1 | 6/2010 | Oprasic et al. |
| 2010/0202839 A1* | 8/2010 | Fang ............ B23C 5/109 407/53 |
| 2010/0239379 A1 | 9/2010 | Choi et al. |
| 2011/0091294 A1 | 4/2011 | Michelet et al. |
| 2011/0123283 A1 | 5/2011 | Michelet et al. |
| 2012/0070240 A1 | 3/2012 | Ishi et al. |
| 2012/0275868 A1 | 11/2012 | Saito et al. |

FOREIGN PATENT DOCUMENTS

| | | |
|---|---|---|
| JP | 2001-157904 A | 6/2001 |
| JP | 2006-224278 A | 8/2006 |
| JP | 2010-142948 A | 7/2010 |
| JP | 2010-179409 A | 8/2010 |
| JP | 2010-536599 A | 12/2010 |
| JP | 2011-51029 A | 3/2011 |
| JP | 2011-115934 A | 6/2011 |
| WO | 2009/157850 A1 | 12/2009 |
| WO | 2010/150907 A1 | 12/2010 |
| WO | 2011/046121 A1 | 4/2011 |

* cited by examiner

NEGATIVE CUTTING INSERT, AND INDEXABLE ROTARY CUTTING TOOL, INDEXABLE ROTARY CUTTING TOOL SYSTEM AND CUTTING METHOD USING SUCH CUTTING INSERT

CROSS REFERENCE TO RELATED APPLICATIONS

This application is a National Stage of International Application No. PCT/JP2012/064782 filed Jun. 8, 2012 (claiming priority based on Japanese Patent Application Nos. 2011-153527 filed Jul. 12, 2011 and 2012-067716 filed Mar. 23, 2012), the contents of all of which are incorporated herein by reference in their entirety.

FIELD OF THE INVENTION

The negative cutting insert of the present invention has a polygonal plate shape comprising upper and lower surfaces, and side surfaces extending between an edge of said upper surface and an edge of said lower surface;

each of said upper surface and said lower surface having four side portions and four corner portions, as well as an annular cutting edge formed along the entire edge, an annular surface portion inclined inward from said annular cutting edge, and a support surface portion extending inside said inclined annular surface portion;

a mounting hole penetrating from said upper surface to said lower surface being provided in said support surface portion;

each annular cutting edge being constituted by four long-side cutting edge portions and four short-side cutting edge portions alternately connected;

each long-side cutting edge portion being constituted by a main long-side cutting edge portion and an auxiliary long-side cutting edge portion connected via a point P;

each short-side cutting edge portion being constituted by a main short-side cutting edge portion and an auxiliary short-side cutting edge portion connected via a point Q, said main short-side cutting edge portion being connected to said auxiliary long-side cutting edge portion via a point R;

each of said main long-side cutting edge portions being located in said side portion;

each of said auxiliary long-side cutting edge portions, said main short-side cutting edge portions and said auxiliary short-side cutting edge portions being located in said corner portion; and the length L1 of said main long-side cutting edge portion and the length L3 of said main short-side cutting edge portion meeting the condition of L1>L3.

BACKGROUND OF THE INVENTION

Because cutting inserts attached to an indexable rotary cutting tool are usually made of expensive WC-Co-based cemented carbide, cutting inserts having point-symmetrical polygonal plate shapes have been conventionally used to use cutting edges formed along edge lines where upper surfaces (rake faces) are crossing side surfaces (flanks), as efficiently as possible. In the case of a square shape, for example, four cutting edges can be used by turning four times.

To increase cutting edge regions, so-called negative (double-sided) cutting inserts have been proposed. Because a negative cutting insert has cutting edges on upper and lower surfaces, after all cutting edges on the upper surface are worn, the cutting insert is turned upside down and reattached to a tool body to use cutting edges on the lower surface for cutting. Accordingly, the negative cutting insert has as many cutting edges as 2 times. As such negative cutting inserts, various ones have been proposed.

JP 2001-157904 A proposes a cutting insert having an octagonal shape comprising an auxiliary cutting edge and a main cutting edge in each corner region, its upper and lower surfaces having eight main cutting edges each, and 16 main cutting edges in total. JP 2006-224278 A proposes a polygonal-plate-shaped, cutting insert comprising a main cutting edge in each side, and a pair of auxiliary cutting edges via a flank in each corner, which can be used 16 times when turned clockwise and counterclockwise. JP 2010-142948 A proposes a square-plate-shaped, negative cutting insert comprising a main cutting edge in each side, and an auxiliary cutting edge in each corner, with a flank having an acute angle to a centerline between a pair of auxiliary cutting edges. JP 2010-536599 A proposes a square-plate-shaped, negative cutting insert capable of conducting precision cutting, which comprises auxiliary cutting edges each extending along a projecting curved edge line having a radius R of curvature between an upper or lower surface and a side surface, and main cutting edges each extending along a edge line between an upper or lower surface and a corner surface, both ends of each main cutting edge being connected to the auxiliary cutting edges. JP 2011-51029 A proposes a polygonal-plate-shaped, negative cutting insert having main cutting edge portions in side portions, and auxiliary cutting edge portions in corner portions. However, these cutting inserts do not have both rough-cutting edge portions and finish-cutting edge portions.

JP 2000-503912 A discloses, as shown in FIG. 19, a hexagonal-plate-shaped cutting insert 110 comprising six sides and six corners 115, the sides comprising rough-cutting edge portions 113 and fine-cutting edge portions 114 alternately, such that it can conduct both rough cutting and fine cutting. However, because this cutting insert 110 has both rough-cutting edge portions 113 and fine-cutting edge portions 114 in the sides, it cannot use the portions 115 for fine cutting. Accordingly, the cutting insert 110 of JP 2000-503912 A cannot be used for the cutting of molding die cavities, etc.

U.S. Pat. No. 7,410,332 discloses, as shown in FIG. 20, a substantially square-plate-shaped, face-milling insert 200 comprising finish-cutting edge portions 201 and rough-cutting edge portions 202. Both finish-cutting edge portions 201 and rough-cutting edge portions 202 are formed in side portions, a finish-cutting edge portion 201 in one side comprising a pair of cutting edge portions 201a, 201b (201c, 201d)connected via a corner 207a with an angle β, and a rough cutting edge portion 202 in one side comprising a pair of cutting edge portions 202a, 202b (202c, 202d) connected via a corner 207bwith angle β'. Accordingly, this face-milling insert 200 is not 90° symmetrical but 180° symmetrical with respect to a mounting center hole 209. Accordingly, the number of finish-cutting edge portions and rough-cutting edge portions in one cutting insert is insufficient.

OBJECTS OF THE INVENTION

Accordingly, the first object of the present invention is to provide a negative cutting insert usable for both rough cutting and finish cutting.

The second object of the present invention is to provide an indexable rotary cutting tool for rough cutting and an indexable rotary cutting tool for finish cutting, to which such cutting inserts are attached.

The third object of the present invention is to provide an indexable rotary cutting system comprising such cutting inserts combined with a rough-cutting tool body and a finish-cutting tool body to carry out both rough cutting and finish cutting with one type of cutting inserts.

The fourth object of the present invention is to provide a cutting method using such cutting inserts combined with a rough-cutting tool body and a finish-cutting tool body to carry out both rough cutting and finish cutting with one type of cutting inserts.

DISCLOSURE OF THE INVENTION

The negative cutting insert of the present invention has a polygonal plate shape comprising upper and lower surfaces, and side surfaces extending between an edge of said upper surface and an edge of said lower surface;

each of said upper surface and said lower surface having four side portions and four corner portions, as well as an annular cutting edge formed along the entire edge, an annular surface portion inclined inward from said annular cutting edge, and a support surface portion extending inside said inclined annular surface portion;

a threaded hole penetrating from said upper surface to said lower surface being provided in said support surface portion;

each annular cutting edge being constituted by four long-side cutting edge portions and four short-side cutting edge portions alternately connected;

each long-side cutting edge portion being constituted by a main long-side cutting edge portion and an auxiliary long-side cutting edge portion connected via a point P;

each short-side cutting edge portion being constituted by a main short-side cutting edge portion and an auxiliary short-side cutting edge portion connected via a point Q, said main short-side cutting edge portion being connected to said auxiliary long-side cutting edge portion via a point R;

each of said main long-side cutting edge portions being located in said side portion;

each of said auxiliary long-side cutting edge portions, said main short-side cutting edge portions and said auxiliary short-side cutting edge portions being located in said corner portion; and the length L1 of said main long-side cutting edge portion and the length L3 of said main short-side cutting edge portion meeting the condition of L1>L3.

The length L1 of said main long-side cutting edge portion and the length L3 of said main short-side cutting edge portion preferably meet the condition of $3 \leq L1/L3 \leq 10$.

Said main long-side cutting edge portion is preferably constituted by a first cutting edge portion and a second cutting edge portion crossing at a center in its length direction, said second cutting edge portion being connected to said auxiliary long-side cutting edge portion via the point P, and said first cutting edge portion and said second cutting edge portion having an obtuse crossing angle β. Said crossing angle β preferably meets the condition of $150° \leq \beta \leq 170°$.

An angle λ1 between said second cutting edge portion and said auxiliary long-side cutting edge portion adjacent to each other, and an angle λ3 between said main short-side cutting edge portion and said auxiliary short-side cutting edge portion adjacent to each other preferably meet the conditions of $7° \leq \lambda 1 \leq 20°$, and $12° \leq \lambda 3 \leq 30°$.

Said main long-side cutting edge portion is preferably used as a rough-cutting edge portion, and said main short-side cutting edge portion is preferably used as a finish-cutting edge portion, so that the entire annular cutting edge is used for rough cutting and finish cutting.

The indexable rotary cutting tool for rough cutting according to the present invention comprises a rough-cutting tool body comprising pluralities of insert seats, and the above cutting insert detachably attached to each of said insert seats, with any one of the connecting points P of each cutting insert positioned at the lowest point of said tool body in a direction of a rotation center axis thereof, and with the connecting points P of all cutting inserts at the lowest point positioned on the same plane perpendicular to said rotation center axis.

The indexable rotary cutting tool for finish cutting according to the present invention comprises a finish-cutting tool body comprising pluralities of insert seats, and the above cutting insert detachably attached to each of said insert seats, with any one of the connecting points Q of each cutting insert positioned at the lowest point of said tool body in a direction of a rotation center axis thereof, and with the connecting points Q of all cutting inserts at the lowest point positioned on the same plane perpendicular to said rotation center axis.

In any of the above indexable rotary cutting tool for rough cutting and the above indexable rotary cutting tool for finish cutting, it is preferable that one of side surface portions on both sides of each corner portion of said cutting insert is a side surface portion having the first cutting edge portion, which is adjacent to said corner portion, and a side surface portion having the second cutting edge portion; that the other of side surface portions on both sides of each corner portion is a side surface portion having the second cutting edge portion, which is adjacent to said corner portion, and a side surface portion having the first cutting edge portion; that at least one of both side surface portions adjacent to said corner portion is in contact with a constraining wall surface of an insert seat of said tool body; and that both side surface portions adjacent to both side surface portions adjacent to said corner portion are in contact with constraining wall surfaces of the insert seat of said tool body, so that at least three side surface portions of said cutting insert on both sides of the corner portion abut said constraining wall surface portions.

The indexable rotary cutting system of the present invention usable for both rough cutting and finish cutting comprises a rough-cutting tool body comprising pluralities of insert seats, a finish-cutting tool body comprising pluralities of insert seats, and the above cutting inserts, the detachable attachment of said cutting inserts to the insert seats of said rough-cutting tool body enables rough cutting, with any one of the connecting points P of each cutting insert positioned at the lowest point of said rough-cutting tool body in a direction of the rotation center axis thereof, and with the connecting points P of all cutting inserts at the lowest point positioned on the same plane perpendicular to said rotation center axis; and the detachable attachment of said cutting inserts to the insert seats of said finish-cutting tool body enables finish cutting, with any one of the connecting points Q of each cutting insert positioned at the lowest point of said finish-cutting tool body in a direction of the rotation center axis thereof, and with the connecting points Q of all cutting inserts at the lowest point positioned on the same plane perpendicular to said rotation center axis.

The method of the present invention for conducting rough cutting and finish cutting to a work comprises
- preparing a rough-cutting tool body comprising pluralities of insert seats, a finish-cutting tool body comprising pluralities of insert seats, and the above cutting inserts;
- detachably attaching said cutting inserts to the insert seats of said rough-cutting tool body, with any one of the connecting points P of each cutting insert positioned at the lowest point of said rough-cutting tool body in a direction of the rotation center axis thereof, and with the connecting points P of all cutting inserts at the lowest point positioned on the same plane perpendicular to said rotation center axis, thereby conducting the rough cutting of said work;
- detachably attaching said cutting inserts to the insert seats of said finish-cutting tool body, with any one of the connecting points Q of each cutting insert positioned at the lowest point of said finish-cutting tool body in a direction of the rotation center axis thereof, and with the connecting points Q of all cutting inserts at the lowest point positioned on the same plane perpendicular to said rotation center axis, thereby conducting the finish cutting of said work; and
- reattaching the cutting inserts used for rough cutting to the insert seats of said finish-cutting tool body to conduct finish cutting, and/or reattaching the cutting inserts used for finish cutting to the insert seats of said rough-cutting tool body to conduct rough cutting.

DESCRIPTION OF THE PREFERRED EMBODIMENTS

Figure 1:
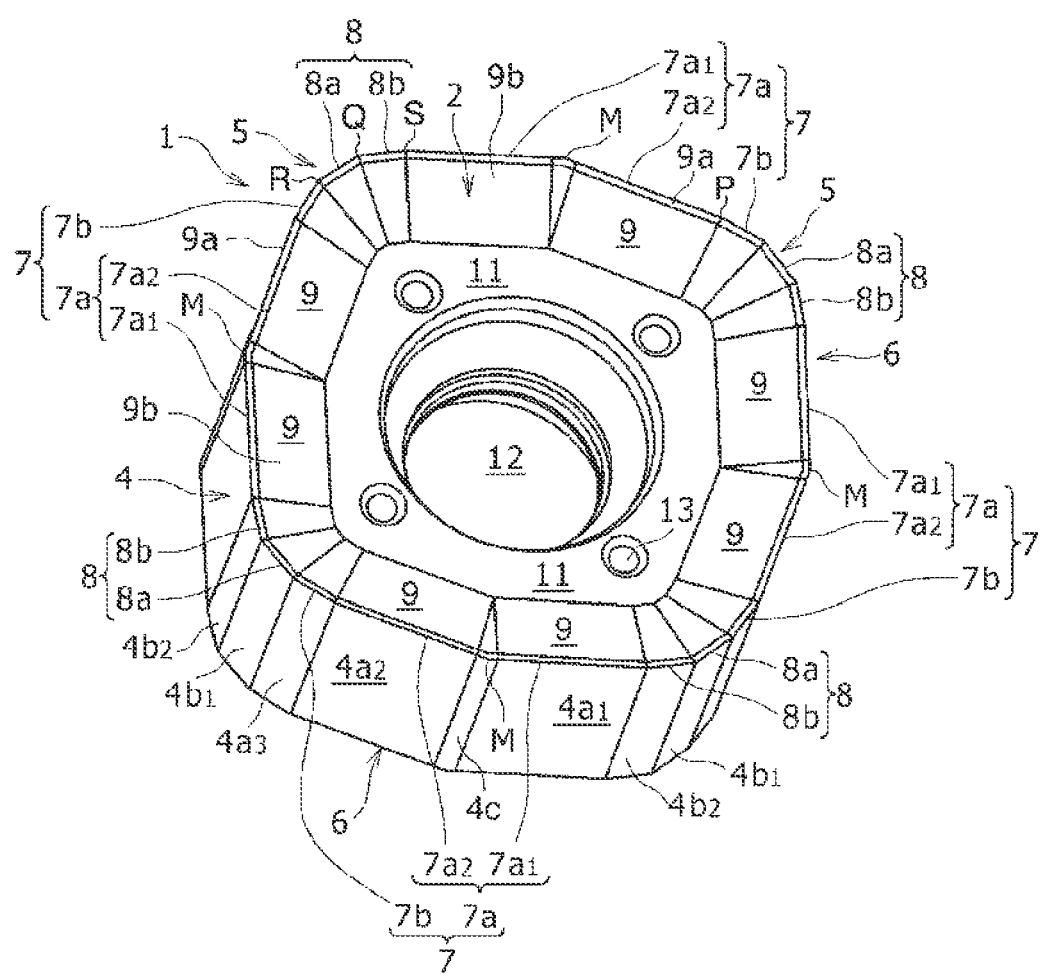
FIG. 1 is a perspective view showing one example of the cutting inserts of the present invention.

Embodiments of the present invention will be explained in detail below referring to the drawings without intention of restricting the present invention thereto, and various modifications are possible within the scope of the present invention.

[1] Cutting Insert (A) Overall Shape

Figure 2:
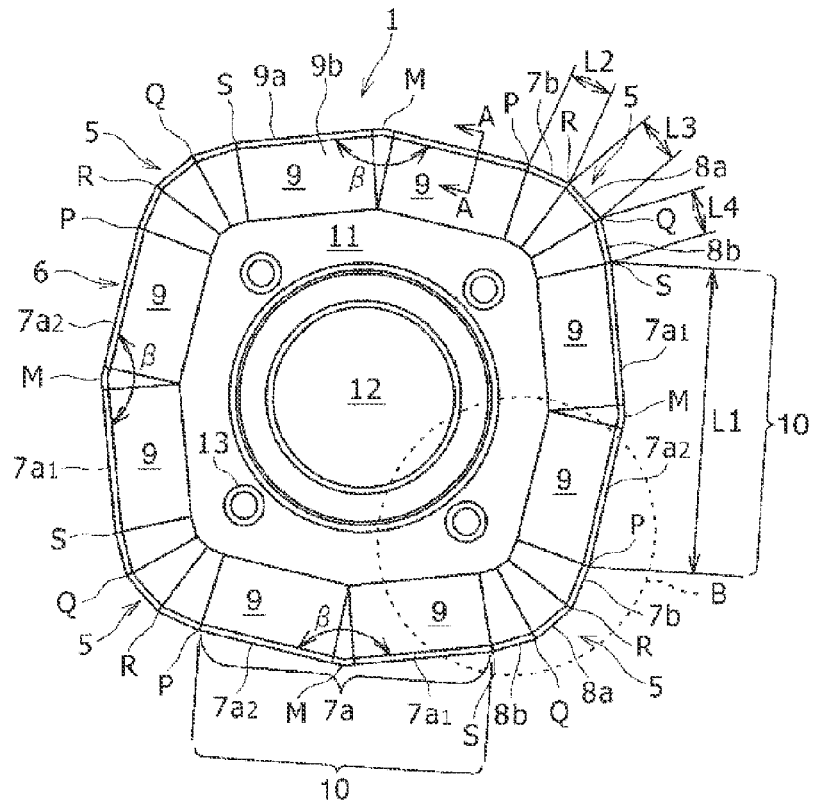
FIG. 2 is a plan view showing an upper surface of the cutting insert of FIG. 1.
Figure 3:
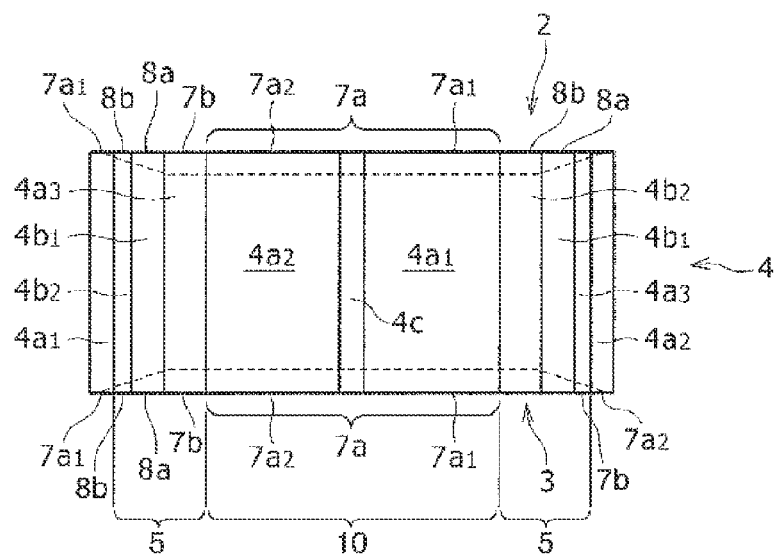
FIG. 3 is a side view showing the cutting insert of FIG. 1.

FIG. 1 is a perspective view showing one example of the cutting inserts 1 of the present invention, FIG. 2 is a plan view showing the cutting insert of FIG. 1, and FIG. 3 is a side view showing the cutting insert of FIG. 1. The cutting insert 1 of the present invention, which is formed, for example, by cemented carbide, has a polygonal planar shape in a plan view. As shown in FIGS. 1-3, the cutting insert 1 comprises a polygonal upper surface 2, a polygonal lower surface 3 opposing the upper surface 2, and a side surface 4 extending between an edge of the upper surface 2 and an edge of the lower surface 3.

The cutting insert 1 is a so-called negative (double-sided) cutting insert having a cutting edge 6 along an entire edge line between the edge of the upper surface 2 and the side surface 4, and a cutting edge 6 along an entire edge line between the edge of the lower surface 3 and the side surface 4. Because the cutting edge 6 is formed along the entire edge between the upper surface 2 and the side surface 4, it is called "annular cutting edge." Because the upper surface 2 and the lower surface 3 have completely the same shape in the negative cutting insert 1, detailed explanations will be made only on the upper surface 2, and such explanations per se are applicable to the lower surface 3.

As described above, the negative cutting insert 1 of the present invention alternately has four rough-cutting edge portions and four finish-cutting edge portions on each of front and rear surfaces (on the upper surface 2 and the lower surface 3), 16 cutting edge portions in total (eight rough-cutting edge portions, and eight finish-cutting edge portions).

As shown in FIGS. 1 and 2, the annular cutting edge 6 is constituted by four long-side edge portions 7 for rough cutting, and four short-side edge portions 8 for finish cutting, which are alternately connected all around the circumference. Each long-side cutting edge portion 7 located in a side portion 10 is constituted by a main long-side cutting edge portion 7a, and an auxiliary long-side cutting edge portion 7b connected at a point P to one end of the main long-side cutting edge portion 7a. The annular cutting edge 6 has four connecting points P in total. Each short-side cutting edge portion 8 is constituted by a main short-side cutting edge portion 8a connected at a point R to the other end of the auxiliary long-side cutting edge portion 7b, and an auxiliary short-side cutting edge portion 8b connected at a point Q to the other end of the main short-side cutting edge portion 8a. The other end of the auxiliary short-side cutting edge portion 8b is connected at a point S to one end of the main long-side cutting edge portion 7a. The annular cutting edge 6 has four connecting points Q in total.

As shown in FIGS. 1 and 2, the annular cutting edge 6 has the auxiliary long-side cutting edge portion 7b, the main short-side cutting edge portion 8a and the auxiliary short-side cutting edge portion 8b in each corner portion 5, the main short-side cutting edge portion 8a being located in a center portion of the corner portion 5, and the auxiliary long-side cutting edge portion 7b being connected at the point R to one end of the main short-side cutting edge portion 8a, which is connected at the point Q to the auxiliary short-side cutting edge portion 8b.

In the example shown in FIGS. 1 and 2, the main long-side cutting edge portion 7a is constituted by two straight cutting edge portions (a first cutting edge portion 7a1 and a second cutting edge portion 7a2) connected at a longitudinal middle point M or in its vicinity. The auxiliary long-side cutting edge portion 7b is connected to the other end (point P) of the second cutting edge portion 7a2. Because the first cutting edge portion 7a1 and the second cutting edge portion 7a2 are crossing with an angle β, the middle point M may be called a crossing point M. The crossing angle β (angle on the side of a mounting hole 12 of the cutting insert 1) of the first cutting edge portion 7a1 and the second cutting edge portion 7a2 is an obtuse angle. The crossing angle β preferably meets the condition of $150° \leq β \leq 170°$.

Each of the first cutting edge portion 7a1 and the second cutting edge portion 7a2 may have an arcuate shape slightly projecting outward the cutting insert 1 in a plan view. When the first cutting edge portion 7a1 and the second cutting edge portion 7a2 have an arcuate shape slightly projecting outward, the crossing angle β is an angle between a straight line connecting both ends of the first cutting edge portion 7a1 and a straight line connecting both ends of the second cutting edge portion 7a2.

Because the main long-side cutting edge portion 7a is constituted by the first cutting edge portion 7a1 and the second cutting edge portion 7a2 crossing with slight outward projection at the middle point M, the cutting insert 1 of the present invention appears to have a substantially octagonal shape derived from a square having four corner portions 5 in a plan view.

The connection of the first cutting edge portion 7a1 and the second cutting edge portion 7a2 with an obtuse crossing angle β at the middle point M or in its vicinity provides the following effects.

(1) Because the main long-side cutting edge portion 7a is divided to the first cutting edge portion 7a1 and the second cutting edge portion 7a2 with the crossing angle β at the middle point M, the first cutting edge portion 7a1 and the second cutting edge portion 7a2 can be used selectively in cutting. For example, in the case of cutting a high-hardness work, the axial cutting depth (ap value) is reduced to use only the second cutting edge portion 7a2, thereby preventing the damage of a cutting edge. On the other hand, in the case of cutting a low-hardness (easily machinable) work, both of the second cutting edge portion 7a2 and the first cutting edge portion 7a1 are used to carry out high-efficiency, high-feed cutting with a large axial cutting depth (ap value) by the long-side cutting edge portion. This is effective particularly when the long-side cutting edge portion 7 is used for rough cutting.

(2) When the cutting insert of the present invention is made of cemented carbide, deformation generated when a pressed green body of cemented carbide powder is sintered should be as small as possible. However, when the crossing angle β of the first cutting edge portion 7a1 and the second cutting edge portion 7a2 is an obtuse angle (particularly $150° \leq β \leq 170°$), stress is less concentrated in a press-molding die cavity, resulting in a pressed green body with uniform density. This makes shrinkage uniform in the sintering step of the pressed green bodies, resulting in sintered bodies with reduced deformation. Because the cutting insert 1 of the present invention is a negative-type insert using cutting edges on the upper and lower surfaces 2, 3, it is important to have an obtuse crossing angle β ($150° \leq β \leq 170°$), to obtain the symmetry of the upper surface 2 and the lower surface 3 by reducing the deformation of the sintered cemented carbide.

In the cutting insert 1 of the present invention, the first cutting edge portion 7a1 and the second cutting edge portion 7a2 constituting the main long-side cutting edge portion 7a mainly function as rough-cutting edge portions, and the auxiliary long-side cutting edge portion 7b adjacent to the main long-side cutting edge portion 7a at a point P functions as a wiper blade for suppressing (adjusting) the roughness of a surface roughly cut by the main long-side cutting edge portion 7a.

Figure 5:
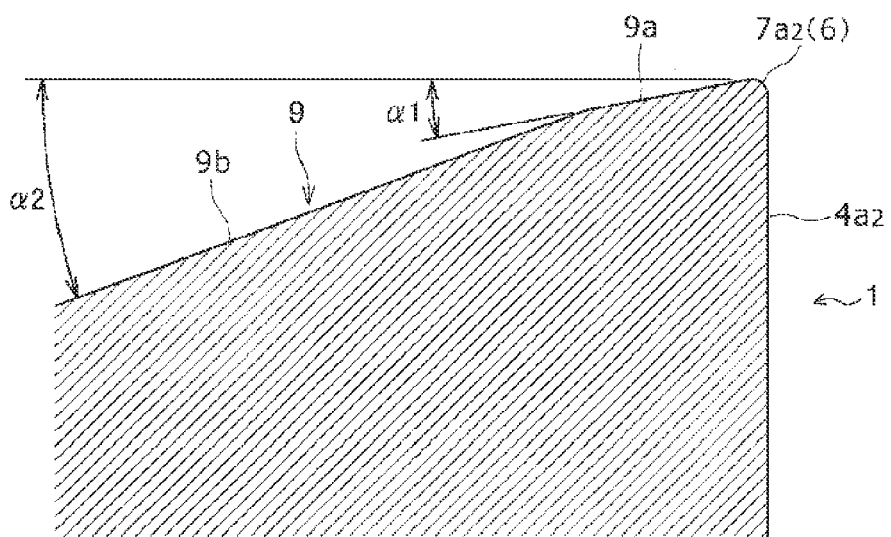
FIG. 5 is a cross-sectional view taken along the line A-A in FIG. 2.

The upper surface 2 of the cutting insert 1 is constituted by an inclined annular surface 9 along the annular cutting edge 6, and a flat support surface portion 11 surrounded by an inner side (lower side) of the inclined annular surface portion 9. As shown in FIG. 5, the inclined annular surface portion 9 is constituted by a first inclined surface (the first rake face) 9a, and a second inclined annular surface portion (second rake face) 9b extending from a lower side of the first inclined annular surface portion 9a to the support surface portion 11. The support surface portion 11 is a flat surface perpendicular to the thickness direction of the cutting insert 1 for closely abutting an insert seat surface of a tool body. By the inclined annular surface portion 9, the support surface portion 11 is located below the annular cutting edge 6 (inward in the thickness direction). A center portion of the support surface portion 11 is provided with a mounting hole 12 penetrating the cutting insert 1 from the upper surface 2 to the lower surface 3. By a screw penetrating the mounting hole 12, the cutting insert 1 is fixed to the insert seat surface.

The support surface portion 11 has marks 13 near corner portions 5. Because all of the rough-cutting edge portions and finish-cutting edge portions of the cutting insert 1 are successively used, marks 13 are provided to confirm the used cutting edge portions. Each mark 13 is provided with a number of 1 to 4, for example, to avoid the confusion of the order of using the corner portions 5.

The side surface 4 extending between the annular cutting edges 6, 6 of the upper and lower surfaces 2, 3 is in parallel to the thickness direction of the cutting insert 1, and perpendicular to the support surface portions 11 on the upper and lower surfaces 2, 3. Because the cutting insert 1 has a polygonal plate shape, as shown in FIGS. 1-3, the side surface 4 has side surface portions 4a1 having first cutting edge portions 7a1, 7a1 along edge lines with the upper and lower surfaces 2, 3, side surface portions 4a2 having second cutting edge portions 7a2, 7a2 along edge lines with the upper and lower surfaces 2, 3, side surface portions 4a3 having auxiliary long-side cutting edge portions 7b, 7balong edge lines with the upper and lower surfaces 2, 3, side surface portions 4b1, 4b1 having main short-side cutting edge portions 8a, 8a along edge lines with the upper and lower surfaces 2, 3, and side surface portions 4b2 having auxiliary short-side cutting edge portions 8b, 8b along edge lines with the upper and lower surfaces 2, 3. The side surface 4 in each side portion 10 is constituted by the side surface portion 4a1 and the side surface portion 4a2 corresponding to the first cutting edge portion 7a1 and the second cutting edge portion 7a2, respectively, and the side surface 4 in each corner portion 5 is constituted by the side surface portions 4a3, 4b1 and 4b2 corresponding to the auxiliary long-side cutting edge portion 7b, the main short-side cutting edge portion 8a and the auxiliary short-side cutting edge portion 8b, respectively. Because the first cutting edge portion 7a1 and the second cutting edge portion 7a2 are connected with an obtuse crossing angle β at a middle point M or in its vicinity, there is a narrow side surface portion 4c between small cutting edge portions around the middle point M as a center.

Though each cutting edge portion constituting the annular cutting edge 6 is straight in the depicted example, all or part of these cutting edge portions may be curved lines slightly projecting outward. When each cutting edge portion is a slightly projecting curved line, each side surface portion 4a1, . . . 4c constituting the side surface 4 is preferably a slightly projecting curved surface following the projecting curved line.

When the crossing point (middle point M) of the first cutting edge portion 7a1 and the second cutting edge portion 7a2 is positioned at a middle point of the main long-side cutting edge portion 7a, the upper and lower surfaces 2, 3 are symmetrical with respect to a center of the mounting hole 12 in a plan view. To provide the cemented carbide with uniform sintering shrinkage, the crossing point M is preferably positioned at a middle point of the main long-side cutting edge portion 7a.

(B) Cutting Edge

As shown in FIG. 2, the main long-side cutting edge portion 7a and the auxiliary long-side cutting edge portion 7b constituting the long-side cutting edge portion 7 have lengths L1, L2, respectively, and the main short-side cutting edge portion 8a and the auxiliary short-side cutting edge portion 8b have lengths L3, L4, respectively, meeting L1>L3, and L2, L3 and L4 being substantially the same. The term "substantially the same" means that L2, L3 and L4 need not be completely the same, but differences of several % are permitted. Further, L1 and L3 preferably meet the condition of $3 \leq L1/L3 \leq 10$.

In a preferred embodiment, the main long-side cutting edge portion 7a for rough cutting has length L1 of 5.0 mm or more, each of the first cutting edge portion 7a1 and the second cutting edge portion 7a2 has length of 2.5 mm or more, and the main short-side cutting edge portion 8a for finish cutting constituting the short-side cutting edge portion 8 has length L3 of 1.0 mm or more.

The length L1, L2, L3, L4 of each cutting edge portion is a rectilinear distance between two ends of each cutting edge portion. For example, the length L1 of the main long-side cutting edge portion 7a is a rectilinear distance between one end (point S) and the other end (point P) of the main long-side cutting edge portion 7a, the length L2 of the auxiliary long-side cutting edge portion 7b is a rectilinear distance between one end (point P) and the other end (point R) of the auxiliary long-side cutting edge portion 7b, the length L3 of the main short-side cutting edge portion 8a is a rectilinear distance between one end (point R) and the other end (point Q) of the main short-side cutting edge portion 8a, and the length L4 of the auxiliary short-side cutting edge portion 8b is a rectilinear distance between one end (point Q) and the other end (point S) of the auxiliary short-side cutting edge portion 8b. When each cutting edge portion constituting the annular cutting edge 6 is a slightly projecting curved line, the length L1, L2, L3, L4 of each cutting edge portion is likewise a rectilinear distance between two ends of each cutting edge portion.

The length L1 of the main long-side cutting edge portion 7a is larger than the length L3 of the main short-side cutting edge portion 8a, and the length L1 of the main long-side cutting edge portion 7a is preferably 5.0 mm or more. The reason for L1>L3 is that in the cutting insert of the present invention comprising pluralities of rough-cutting edge portions each comprising a main long-side cutting edge portion 7a and an auxiliary long-side cutting edge portion 7b), and pluralities of finish-cutting edge portions each comprising a main short-side cutting edge portion 8a and an auxiliary short-side cutting edge portion 8b), the length L1 of the main long-side cutting edge portion 7a is larger than the length L3 of the main short-side cutting edge portion 8a for finish cutting, to achieve high efficiency of rough cutting. The reason for L1≥5.0 mm is that when the length L1 of the main long-side cutting edge portion 7a is less than 5.0 mm, rough cutting with the main long-side cutting edge portion 7a does not have high efficiency. Because too large length L1 provides an excessive load to the main long-side cutting edge portion 7a during rough cutting, the upper limit of L1 is preferably about 12 mm.

The main short-side cutting edge portion 8a preferably has length L3 of 1.0 mm or more. The reason for L3≥1.0 mm is that though the length L3 of the main short-side cutting edge portion 8a for finish cutting should be smaller than the length L1 of the main long-side cutting edge portion 7a for rough cutting, L3 of 1.0 mm or more can provide finish-cut surfaces with small roughness. However, too large L3 provides too large a cutting load to the main short-side cutting edge portion 8a during finish cutting, likely causing vibration and the premature wear of the cutting edge portions, thereby likely providing finish-cut surfaces with large roughness. Accordingly, the upper limit of the length L3 of the main short-side cutting edge portion 8a is preferably about 5 mm. To provide finish-cut surfaces with good roughness, the main short-side cutting edge portion 8a and the auxiliary short-side cutting edge portion 8b constituting the short-side cutting edge portion 8 preferably have an arcuate shape slightly projecting outward.

As described above, because the cutting insert of the present invention produced by sintering a press-molded body of cemented carbide powder comprising WC powder and Co powder at a temperature of about 1300-1400° C. undergoes slight shrinkage in a sintering step, each portion thereof should have a uniform shrinkage ratio to provide a sintered body with dimensional accuracy in a predetermined range. For this purpose, it is preferable that L1 and L3 are set to meet the condition of $3 \leq L1/L3 \leq 10$, that the cutting insert 1 has four corner portions 5, and that the long-side cutting edge portion 7 has a corner portion at a middle point M, thereby providing a substantially octagonal shape in a plan view.

Figure 4:
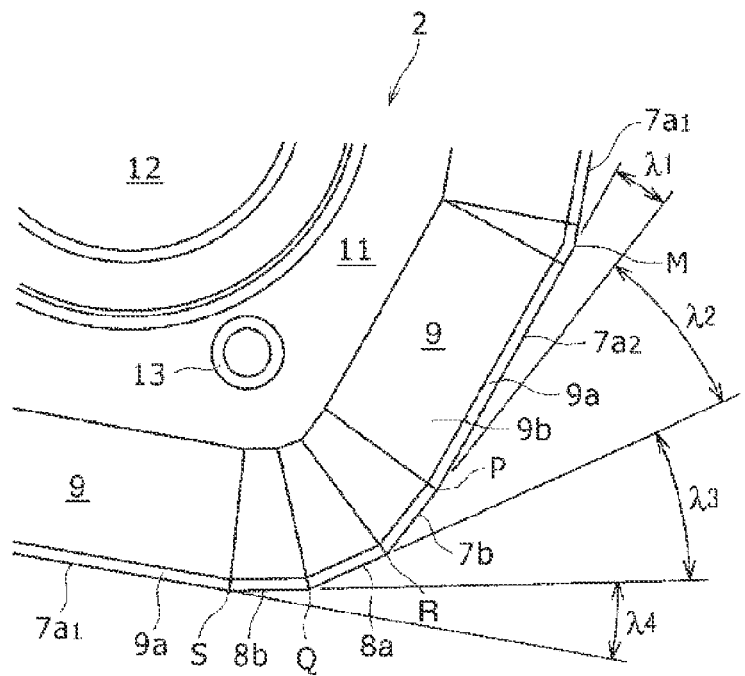
FIG. 4 is a partial, enlarged plan view showing in detail a structure inside a circle B in FIG. 2.

The cutting edge portion in each corner portion 5 among the annular cutting edge 6 is constituted by the auxiliary long-side cutting edge portion 7b, the main short-side cutting edge portion 8a, and the auxiliary short-side cutting edge portion 8b. As shown in FIG. 4, an angle $\lambda 1$ between the second cutting edge portion 7a2 constituting the long-side cutting edge portion 7a and the auxiliary long-side cutting edge portion 7b connected thereto at a point P preferably meets the condition of $7° \leq \lambda 1 \leq 20°$. The angle $\lambda 1$ is an angle between a straight line connecting both ends P and M of the second cutting edge portion 7a2, and a straight line connecting both ends P and R of the auxiliary long-side cutting edge portion 7b. Because the main long-side cutting edge portion 7a constituted by the first cutting edge portion 7a1 and the second cutting edge portion 7a2 functions as a main cutting edge portion during rough cutting, and because the auxiliary long-side cutting edge portion 7b functions as a cutting edge portion (wiper blade) for adjusting the roughness of surfaces roughly cut by the main long-side cutting edge portion 7a, $\lambda 1 < 7°$ provides too small axial cutting depth to a work, resulting in low rough-cutting efficiency. On the other hand, $\lambda 1 > 20°$ provides too thick rough-cut chips, resulting in the premature wear of the main long-side cutting edge portion 7a. Accordingly, the angle $\lambda 1$ is preferably set in a range of $7° \leq \lambda 1 \leq 20°$. Particularly in the case of roughly cutting a high-hardness work, the upper limit of the angle $\lambda 1$ is preferably 15°.

An angle $\lambda 3$ between the main short-side cutting edge portion 8a for finish cutting and the auxiliary short-side cutting edge portion 8b connected thereto at a point Q preferably meets the condition of $12° \leq \lambda 3 \leq 30°$. The angle $\lambda 3$ is an angle between a straight line connecting both ends R and Q of the main short-side cutting edge portion 8a, and a straight line connecting both ends Q and S of the auxiliary short-side cutting edge portion 8b. $\lambda 3$ of less than 12° provides insufficient axial cutting depth during finish cutting, resulting in low finish-cutting efficiency. $\lambda 3$ of 30° or less does not provide a large load to the main short-side cutting edge portion 8a during finish cutting, preventing premature wear. The more preferred angle $\lambda 3$ meets the condition of $15° \leq \lambda 3 \leq 27°$.

An angle $\lambda 2$ between the auxiliary long-side cutting edge portion 7b and the main short-side cutting edge portion 8a preferably meets the condition of $20° \leq \lambda 2 \leq 35°$, and an angle $\lambda 4$ between the auxiliary short-side cutting edge portion 8b and the first cutting edge portion 7a1 preferably meets the condition of $8° \leq \lambda 4 \leq 16°$.

Because an indexable rotary cutting tool, to which the negative cutting inserts 1 of the present invention each having cutting edges on both sides (upper and lower surfaces 2, 3) are attached, has a negative axial rake angle to secure a clearance angle in cutting, it undergoes larger cutting resistance than that of an indexable rotary cutting tool, to which positive-type cutting inserts each having a cutting edge only on an upper surface with a positive axial rake angle are attached. Accordingly, as shown in FIG. 5, the cutting insert 1 of the present invention has a downward-inclined annular surface portion 9 extending from the annular cutting edge 6 to the support surface portion 11 in each of the upper and lower surfaces 2, 3. The inclined annular surface portion 9 functioning as a rake face is a two-step-inclined surface comprising a first inclined annular surface portion 9a along the annular cutting edge 6, and a second inclined annular surface portion 9b extending from an inner end of the first inclined annular surface portion 9a to the support surface portion 11. By the two-step-inclined annular surface portion 9, each cutting insert 1 of the present invention attached to a tool body has a longitudinal rake angle close to a positive value, resulting in reduced cutting resistance.

The inclination angle $\alpha 1$ of the first inclined annular surface portion 9a to a plane perpendicular to the thickness direction of the cutting insert 1 preferably meets the condition of $0° < \alpha 1 \leq 20°$. Also, the inclination angle $\alpha 2$ of the second inclined annular surface portion 9b to a plane perpendicular to the thickness direction of the cutting insert 1 preferably meets the conditions of $15° \leq \alpha 2 \leq 30°$, and $\alpha 1 \leq \alpha 2$. To secure sufficient edge strength in cutting with low cutting resistance and high efficiency, the inclination angle $\alpha 1$ is preferably in a range of 5-15°, and the inclination angle $\alpha 2$ is preferably in a range of 15-25°.

[2] Structure of Indexable Rotary Cutting Tool

Figure 6:
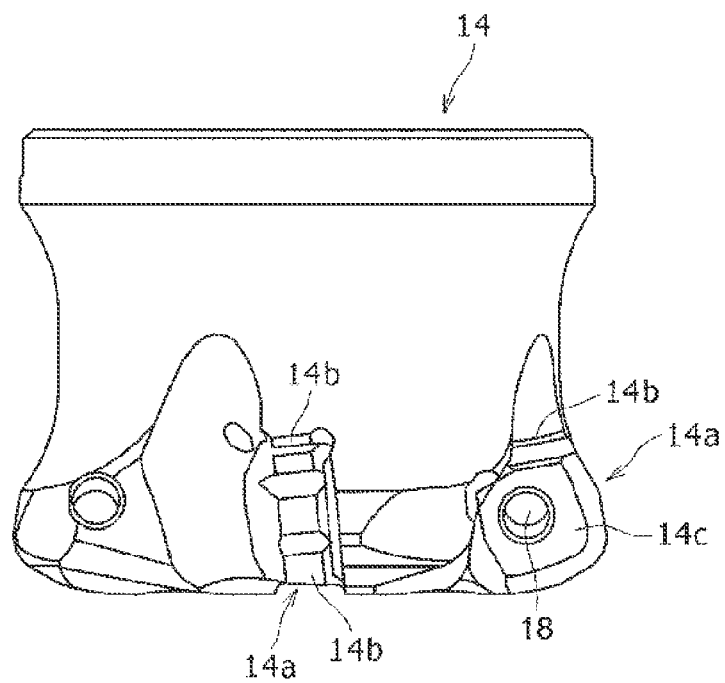
FIG. 6 is a side view showing a rough-cutting tool body, to which the cutting inserts of the present invention are attached.
Figure 7:
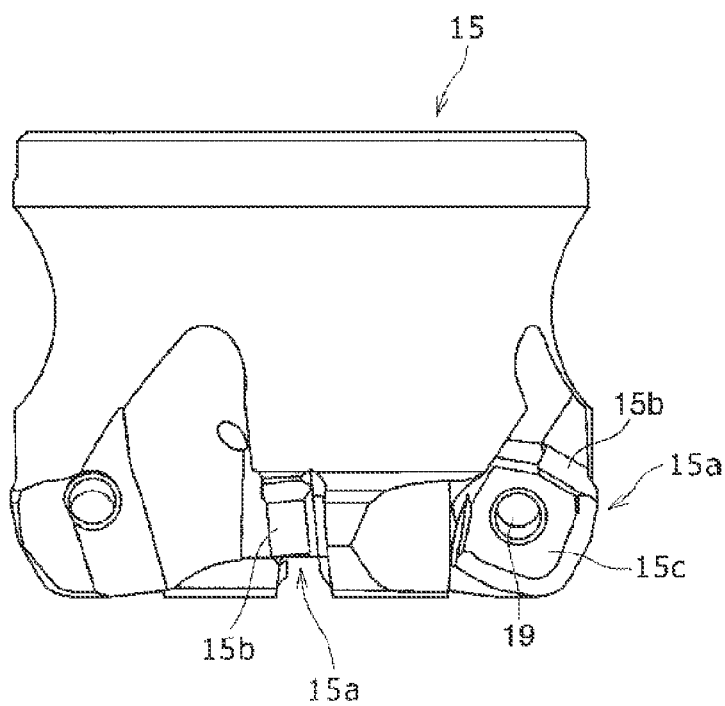
FIG. 7 is a side view showing a finish-cutting tool body, to which the cutting inserts of the present invention are attached.

FIGS. 6 and 8(*a*) show one example of rough-cutting tool bodies 14, to which the cutting inserts 1 of the present invention are attached, and FIGS. 7 and 8(*b*) show one example of finish-cutting tool bodies 15, to which the cutting inserts 1 of the present invention are attached. Any of the rough-cutting tool body 14 and the finish-cutting tool body 15 is a bore-type tool body for an indexable rotary cutting tool, having pluralities of (for example, 3-6) insert seats, to which cutting inserts 1 are detachably attached by screws, along its periphery. Of course, these tool bodies are not restricted to a bore-type, but may be a shank-type. A rear end portion of each tool body 14, 15 is attached to a machining center. The tool bodies 14, 15 are made of alloyed tool steel such as SKD61, etc.

(A) Indexable Rotary Cutting Tool for Rough Cutting

As shown in FIGS. 6 and 8(*a*), each of plural insert seats 14a in the tool body 14 of the indexable rotary cutting tool of the present invention for rough cutting comprises a constraining wall surface 14b, a planar insert seat surface 14c located radially outside the constraining wall surface 14b, and a threaded hole 18 located substantially in a center portion of the insert seat surface 14c. The constraining wall surface 14b extending from the insert seat surface 14c by a predetermined height comprises a pair of constraining planar wall surface portions 14b1, 14b2 located outside, and a pair of free wall surface portions 14d1, 14d2 located inside. A large groove 14f1 is provided between adjacent free wall surface portions 14d1 and 14d2, and small grooves 14f2 are provided respectively between the constraining wall surface portion 14b1 and the free wall surface portion 14d1 adjacent to each other, and between the free wall surface portion 14d2 and the constraining wall surface portion 14b2 adjacent to each other.

Figure 11A:
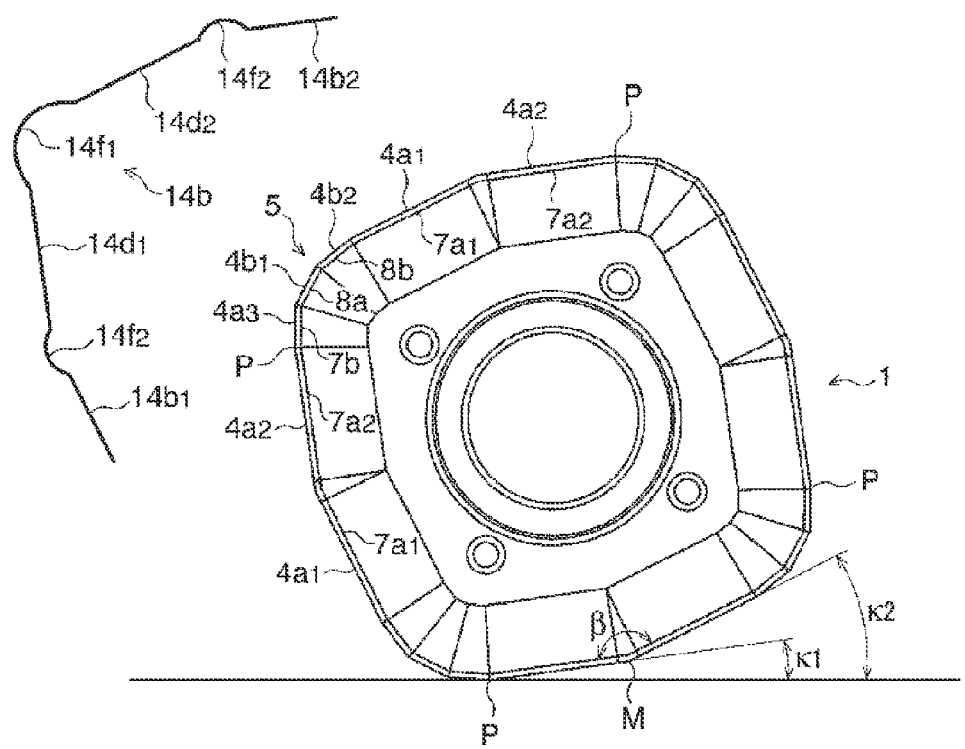
FIG. 11(a) is a view schematically showing the positional relation between side surface portions of a cutting insert and a constraining wall surface of an insert seat of a rough-cutting tool body in the case of two-plane constraint, in which the side surface portions are not in contact with the constraining wall surface.
Figure 11B:
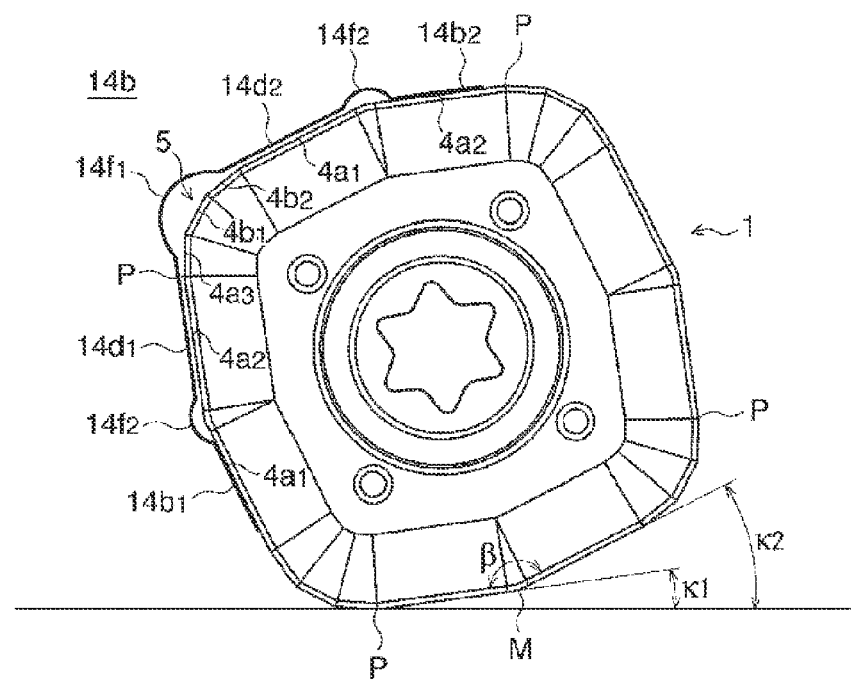
FIG. 11(b) is a view schematically showing the positional relation between the side surface portions of the cutting insert and the constraining wall surface of the insert seat of the rough-cutting tool body in the case of two-plane constraint, in which the side surface portions are in contact with the constraining wall surface.

FIGS. 11(a) and 11(b) show a case where the cutting insert 1 is constrained by two surfaces. The side surface of the cutting insert 1, which is brought into contact with the constraining wall surface 14b, has a first side surface portion 4a1, a second side surface portion 4a2, a third side surface portion 4a3, a fourth side surface portion 4b1, a fifth side surface portion 4b2, a sixth side surface portion 4a1, and a seventh side surface portion 4a2 clockwise from the left side of the figure. When the cutting insert 1 is fixed to the insert seat 14a, the first side surface portion 4a1 abuts the constraining wall surface portion 14b1, the second side surface portion 4a2 opposes the free wall surface portion 14d1, the sixth side surface portion 4a1 opposes the free wall surface portion 14d2, and the seventh side surface portion 4a2 abuts the constraining wall surface portion 14b2.

Both of an angle between the constraining wall surface portion 14b1 and the free wall surface portion 14d1, and an angle between the constraining wall surface portion 14b2 and the free wall surface portion 14d2 are equal to or substantially equal to the above crossing angle β.

The width (length in a direction parallel to the insert seat surface 14c) of the constraining wall surface portions 14b1, 14b2 and the free wall surface portions 14d1, 14d2 is preferably about ¾ of the length of the first cutting edge portion 7a1 and the second cutting edge portion 7a2.

A corner portion 5 constituted by the third side surface portion 4a3, the fourth side surface portion 4b1 and the fifth side surface portion 4b2 is received in the large groove 14f1, and a corner portion at a middle point M between the first side surface portion 4a1 and the second side surface portion 4a2 and a corner portion at a middle point M between the sixth side surface portion 4a1 and the seventh side surface portion 4a2 are respectively received in the small grooves 14f2. Accordingly, the corner portion 5 and the corner portions at the middle point M are not brought into contact with the constraining wall surface 14b.

The first and seventh side surface portions 4a1, 4a2 of the cutting insert 1 abut the constraining wall surface portions 14b1, 14b2 of the mounting seat 14a to prevent the rotation (displacement) of the cutting insert 1 by a cutting load. Between the second and sixth side surface portions 4a2, 4a1 of the cutting insert 1 and the free wall surface portions 14d1, 14d2 of the mounting seat 14a, there is preferably a gap of about 0.05 mm at maximum.

By a low step 14e surrounding the insert seat surface 14c, the annular cutting edge 6 and inclined annular surface portion 9 of the cutting insert 1 mounted onto the insert seat 14a are not brought into contact with the seat surface 14c. Accordingly, when the cutting insert 1 is fixed to the insert seat surface 14c, the annular cutting edge 6 is not damaged.

Figure 12A:
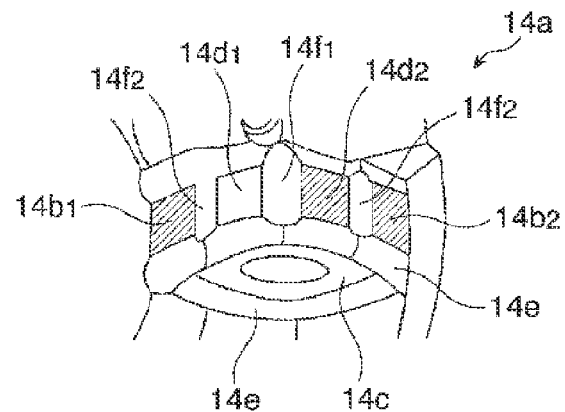
FIG. 12(a) is a partial perspective view showing a wall surface of an insert seat of the rough-cutting tool body for constraining the side surface portions of the cutting insert in one example of three-plane constraints.

FIG. 12(a) shows one example of three-plane constraints of the cutting insert 1 attached to the insert seat 14a of the rough-cutting tool body 14. Of course, the same is basically true of the three-plane constraint of the cutting insert 1 attached to an insert seat 15a of a finish-cutting tool body 15. In FIG. 12(a), wall surface portions coming into contact with the side surface portions of the cutting insert 1 in the three-plane constraint are hatched. When the cutting insert 1 is fixed to the insert seat 14a, the first side surface portion 4a1 abuts the constraining wall surface portion 14b1, the second side surface portion 4a2 opposes the free wall surface portion 14d1, the sixth side surface portion 4a1 abuts the constraining wall surface portion 14d2, and the seventh side surface portion 4a2 abuts the constraining wall surface portion 14b2. The abutting of the first, sixth and seventh side surface portions 4a1, 4a1 4a2 of the cutting insert 1 to the constraining wall surface portions 14b1, 14d2 and 14b2 of the mounting seat 14a prevents the rotation (displacement) of the cutting insert 1 by a cutting load. Between the second side surface portion 4a2 of the cutting insert 1 and the free wall surface portion 14d1 of the mounting seat 14a, there is preferably a gap of about 0.30 mm at maximum. This three-plane constraint ensures the fixing of the cutting insert 1 with excellent deflection accuracy and runout accuracy. Apart from the above points, it may be basically the same as the two-plane constraint.

Figure 12B:
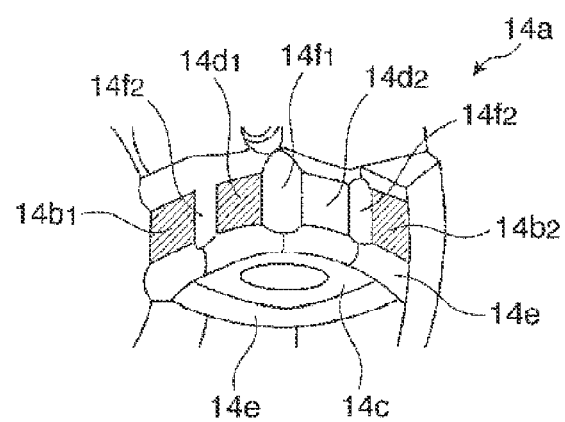
FIG. 12(b) is a partial perspective view showing a wall surface of an insert seat of the rough-cutting tool body for constraining the side surface portions of the cutting insert in another example of three-plane constraints.

FIG. 12(b) shows another example of three-plane constraints of the cutting insert 1 attached to the insert seat 14a of the rough-cutting tool body 14. Of course, the same is basically true of the three-plane constraint of the cutting insert 1 attached to an insert seat 15a of a finish-cutting tool body 15. In FIG. 12(b), wall surface portions coming into contact with the side surface portions of the cutting insert 1 in the three-plane constraint are hatched. When the cutting insert 1 is fixed to the insert seat 14a, the first side surface portion 4a1 abuts the constraining wall surface portion 14b1, the second side surface portion 4a2 abuts the constraining wall surface portion 14d1, the sixth side surface portion 4a1 opposes the free wall surface portion 14d2, and the seventh side surface portion 4a2 abuts the constraining wall surface portion 14b2. The abutting of the first, second and seventh side surface portions 4a1, 4a2, 4a2 of the cutting insert 1 to the constraining wall surface portions 14b1, 14d1, 14b2 of the mounting seat 14a prevents the rotation (displacement) of the cutting insert 1 by a cutting load. Between the sixth side surface portion 4a1 of the cutting insert 1 and the free wall surface portion 14d2 of the mounting seat 14a, there is preferably a gap of about 0.30 mm at maximum. Apart from the above points, it may be basically the same as the two-plane constraint.

Figure 12C:
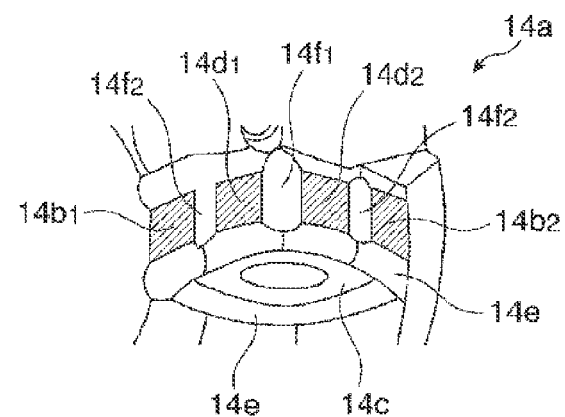
FIG. 12(c) is a partial perspective view showing a wall surface of an insert seat of the rough-cutting tool body for constraining the side surface portions of the cutting insert in the case of four-plane constraint.

FIG. 12(c) shows the four-plane constraint of the cutting insert 1 attached to the insert seat 14a of the rough-cutting tool body 14. Of course, the same is basically true of the four-plane constraint of the cutting insert 1 attached to an insert seat 15a of a finish-cutting tool body 15. In FIG. 12(c), wall surface portions coming into contact with the side surface portions of the cutting insert 1 in the four-plane constraint are hatched. When the cutting insert 1 is fixed to the insert seat 14a, the first side surface portion 4a1 abuts the constraining wall surface portion 14b1, the second side surface portion 4a2 abuts the constraining wall surface portion 14d1, the sixth side surface portion 4a1 abuts the constraining wall surface portion 14d2, and the seventh side surface portion 4a2 abuts the constraining wall surface portion 14b2. The abutting of the first, second, sixth and seventh side surface portions 4a1, 4a2, 4a1, 4a2 of the cutting insert 1 to the constraining wall surface portions 14b1, 14d1, 14d2, 14b2 of the mounting seat 14a prevents the rotation (displacement) of the cutting insert 1 by a cutting load. Apart from the above points, it may be basically the same as the two-plane constraint.

In the indexable rotary cutting tool of the present invention for rough cutting, the constraining wall surface 14b and the insert seat surface 14c are positioned and their inclination angles are set, such that any one of the connecting points P of the cutting insert 1 is positioned at the lowest point in a direction of the rotation center axis O. With the connecting point P of the second cutting edge portion 7a2 of the main long-side cutting edge portion 7a and the auxiliary long-side cutting edge portion 7b as the lowest point, the main long-side cutting edge portion 7a located forward in a feed direction contributes mainly to cutting, while the auxiliary long-side cutting edge portion 7b located rearward in a feed direction functions to adjust the roughness of a surface cut by the main cutting edge portion 7a.

In the indexable rotary cutting tool of the present invention for rough cutting, it is preferable not only that any one of the connecting points P of the cutting insert 1 is positioned at the lowest point in a direction of the rotation center axis O, but also that the second cutting edge portion 7a2 connected to said connecting point P is inclined by a predetermined angle. A cutting edge angle κ1 expressing the inclination angle of the second cutting edge portion 7a2 is an angle between a straight line connecting a connecting point P at the lowest point to the connecting point M, and a plane perpendicular to the rotation center axis O at the connecting point P. A cutting edge angle κ2 expressing the inclination angle of the first cutting edge portion 7a1 connected to said second cutting edge portion 7a2 at a point M is an angle between a straight line connecting the point M to the point S and a plane perpendicular to the rotation center axis O. With the crossing angle β between the first cutting edge portion 7a1 and the second cutting edge portion 7a2, κ2=κ1+(180°−β). To achieve highly efficient rough cutting, the cutting edge angles κ1, κ2 preferably meet the conditions of 5°≤κ1≤20°, and 15°≤λ2≤50°.

Of course, the connecting points P of all cutting inserts 1 at the lowest point are positioned on the same plane perpendicular to the rotation center axis O. As a result, the main long-side cutting edge portions 7a for rough cutting and the auxiliary long-side cutting edge portions 7b of all cutting inserts 1 are uniformly brought into contact with a work, so that high-feed rough cutting can be conducted smoothly. Also, with chattering, etc. suppressed, it is possible to prevent chipping, breakage, etc. in the cutting edge of the cutting insert 1.

To position any one of the connecting points P of the cutting insert 1 at the lowest point in a direction of the rotation center axis O, and to set the cutting edge angle κ1 of the second cutting edge portion 7a2 at said connecting point P in a predetermined range, the positions and inclination angles of the constraining wall surface 14b and the insert seat surface 14c are set in predetermined ranges. This may be conducted by a geometrical method shown, for example, in FIG. 13.

Figure 13:
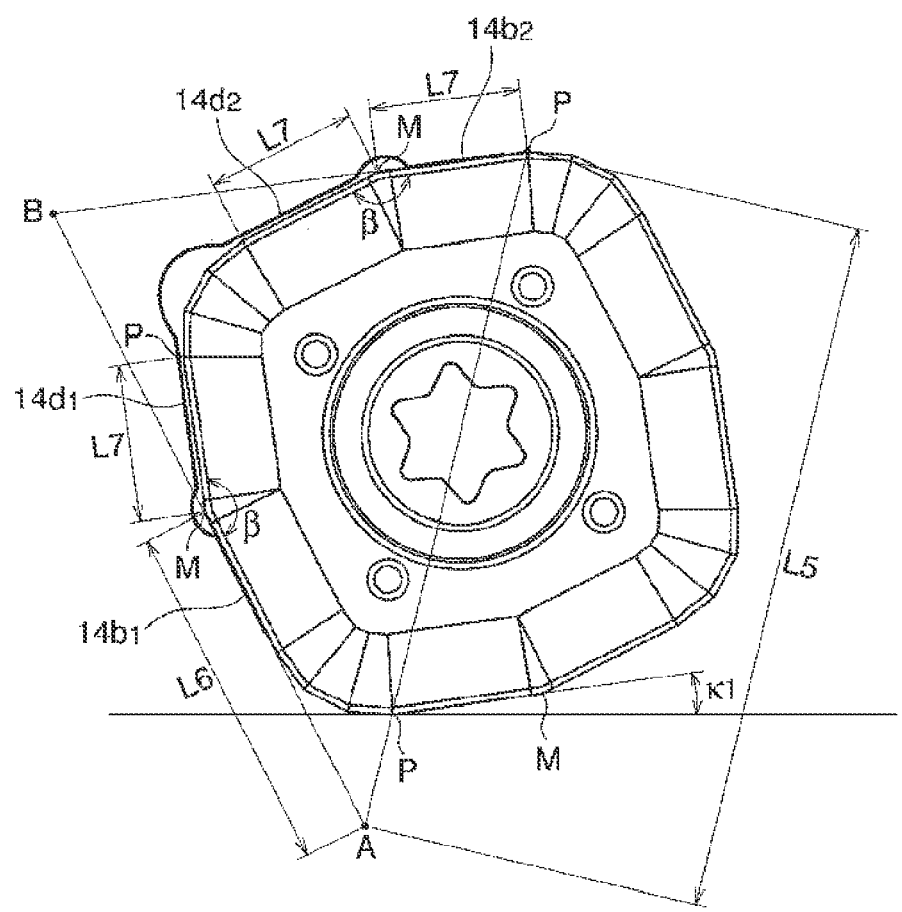
FIG. 13 is a schematic view showing a method for geometrically positioning the constraining wall surface of the insert seat of the rough-cutting tool body.

A triangle ABP shown in FIG. 13 is constituted by one straight line connecting a point P positioned at the lowest point to a point P positioned at the highest point, and two straight lines tangent to the first and second cutting edge portions 7a1, 7a2 in the main long-side cutting edge portion 7a of the cutting insert 1. Accordingly, the triangle ABP is determined by the shape of the cutting insert 1. With the length L5 of a line segment AP, the length L6 of a line segment AM, the length L7 of the first cutting edge portion 7a1 and the second cutting edge portion 7a2, and the crossing angle β of the first cutting edge portion 7a1 and the second cutting edge portion 7a2 introduced into the triangle ABP, the positions of the constraining wall surface portions 14b1, 14b2 and the free wall surface portions 14d1, 14d2 in the constraining wall surface 14b, and the position of the insert seat surface 14c, and their inclination angles are determined. Of course, the positioning of the constraining wall surface portions 14b1, 14b2 and the free wall surface portions 14d1, 14d2 is not restricted to this method.

As shown in FIG. 13, the inclination angles of the constraining wall surface portions 14b1, 14b2 and the free wall surface portions 14d1, 14d2 at a connecting point P positioned at the lowest point vary depending on the cutting edge angle κ1 of the second cutting edge portion 7a2. Accordingly, the inclination angles of the constraining wall surface portions 14b1, 14b2 and the free wall surface portions 14d1, 14d2 need only be changed depending on a desired cutting edge angle κ1.

As shown in FIG. 13, the positions and inclination angles of the constraining wall surface portions 14b1, 14b2 and the free wall surface portions 14d1, 14d2 are determined by the shape of the cutting insert 1. Accordingly, when cutting inserts 1 having different shapes are used, the positions and inclination angles of the constraining wall surface portions 14b1, 14b2 and the free wall surface portions 14d1, 14d2 may be determined depending on their shapes.

With the support surface portion 11 on the upper or lower surface 2, 3 of the cutting insert 1 in close contact with the insert seat surface 14c, and with each side surface portion of the cutting insert 1 abutting the corresponding constraining wall surface portion 14b1, 14b2 of the constraining wall surface 14b, the screw 16 is inserted into the mounting hole 12 of the cutting insert 1, and threadably engages the threaded hole 18 of the insert seat surface 14c with a predetermined torque. As a result, the cutting insert 1 is firmly fixed to the insert seat 14a of the rough-cutting tool body 14, such that the connecting point P is positioned at the lowest point in a direction of the rotation center axis O.

It is possible to confirm by an imaging apparatus having a camera with an image sensor such as CCD, etc. whether or not the connecting points P of all cutting inserts 1 attached to the insert seats 14a are at the lowest point of the indexable rotary cutting tool for rough cutting. The position of each cutting insert 1 attached to the insert seat 14a can be finely adjusted based on the measurement results of the connecting point P, if necessary.

(B) Indexable Rotary Cutting Tool for Finish Cutting

The cutting insert 1 is attached to each insert seat 15a of a tool body 15 of the indexable rotary cutting tool of the present invention for finish cutting, such that a short-side cutting edge portion 8 composed of a main short-side cutting edge portion 8a and an auxiliary short-side cutting edge portion 8b adjacent to each other via a connecting point Q is used for cutting.

Figure 8A:
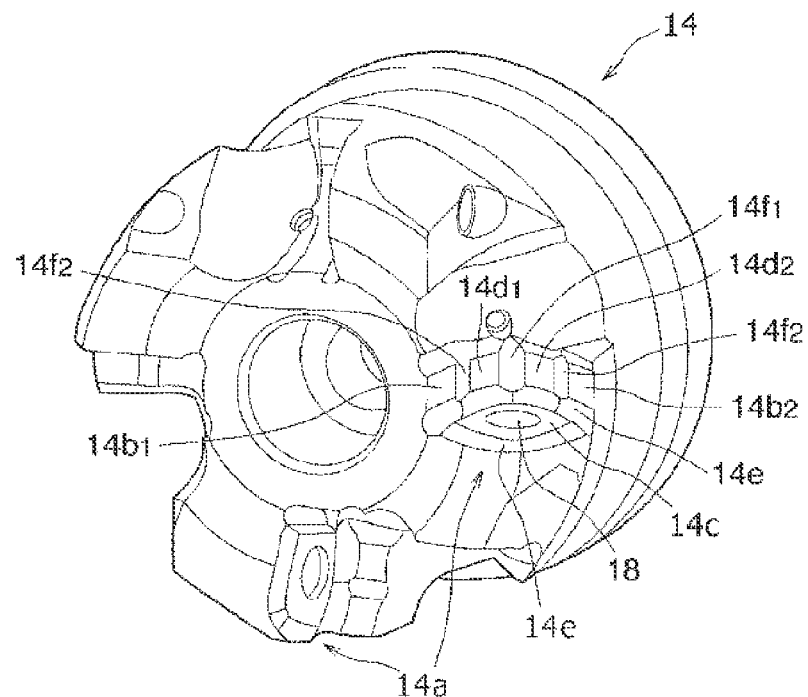
FIG. 8(a) is a perspective view showing the rough-cutting tool body of FIG. 6.
Figure 8B:
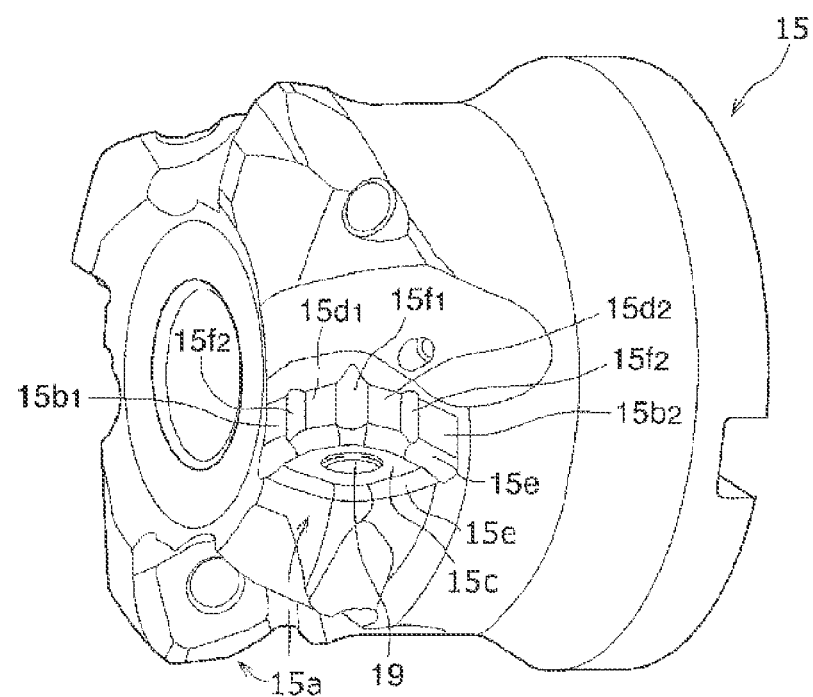
FIG. 8(b) is a perspective view showing the finish-cutting tool body of FIG. 7.
Figure 9:
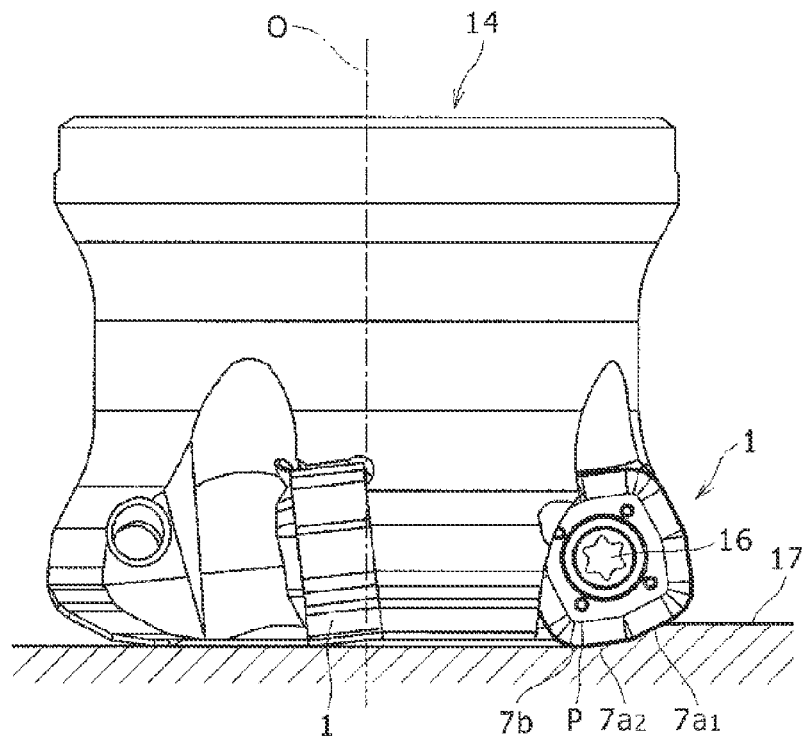
FIG. 9 is a side view showing an indexable rotary cutting tool for rough cutting comprising the rough-cutting tool body of FIG. 6, to which the cutting inserts of the present invention are attached.
Figure 10:
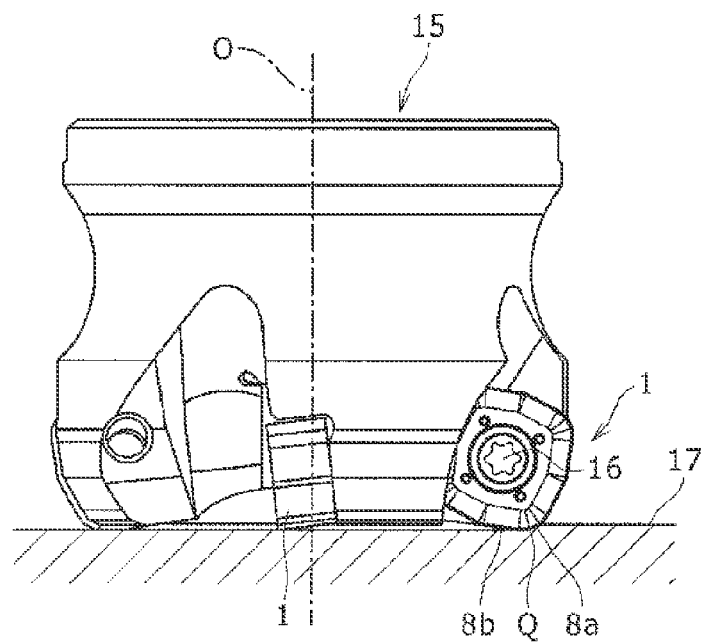
FIG. 10 is a side view showing an indexable rotary cutting tool for finish cutting comprising the finish-cutting tool body of FIG. 7, to which the cutting inserts of the present invention are attached.

The finish-cutting tool body 15 shown in FIGS. 7 and 8(b) differs from the rough-cutting tool body 14 shown in FIGS. 6 and 8(a), in such arrangement of the insert seat surface 15c and the constraining wall surface 15b that any one of the connecting point Q of the cutting insert 1 is positioned at the lowest point in a direction of the rotation center axis O as shown in FIG. 10.

As shown in FIGS. 7 and 8(b), each of plural insert seats 15a in the tool body 15 of the indexable rotary cutting tool of the present invention for finish cutting comprises a constraining wall surface 15b, a planar insert seat surface 15c located radially outside of the constraining wall surface 15b, and a threaded hole 19 located in a substantially center portion of the insert seat surface 15c. The constraining wall surface 15b having a predetermined height from the insert seat surface 15c comprises a pair of constraining planar wall surface portions 15b1, 15b2 located outside and a pair of free wall surface portions 15d1, 15d2 located inside. There is a large groove 15f1 between adjacent free wall surface portions 15*d*1 and 15*d*2, and there are small grooves 15*f*2, 15*f*2 between the constraining wall surface portion 15*b*1 and the free wall surface portion 15*d*1 adjacent to each other, and between the free wall surface portion 15*d*2 and the constraining wall surface portion 15*b*2 adjacent to each other.

Figure 14A:
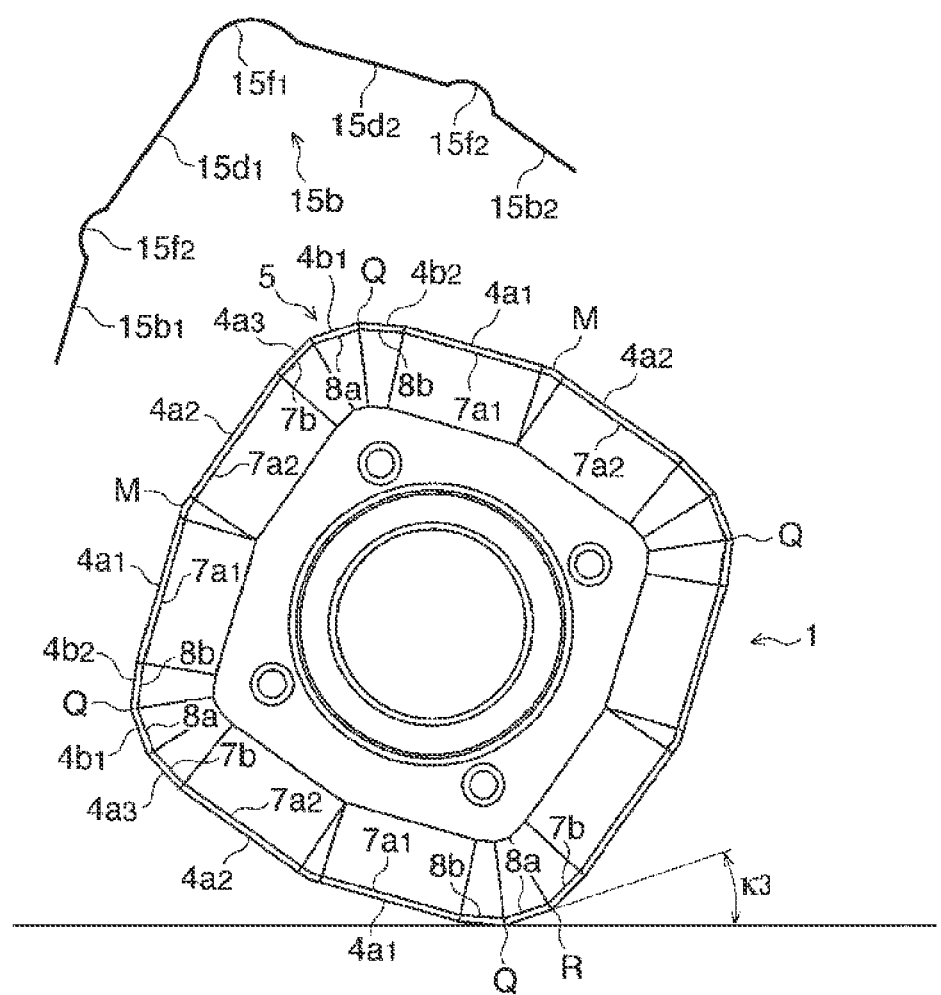
FIG. 14(a) is a view schematically showing the positional relation between the side surface portions of the cutting insert and the constraining wall surface of the insert seat of the finish-cutting tool body in the case of two-plane constraint, in which the side surface portions are not in contact with the constraining wall surface.
Figure 14B:
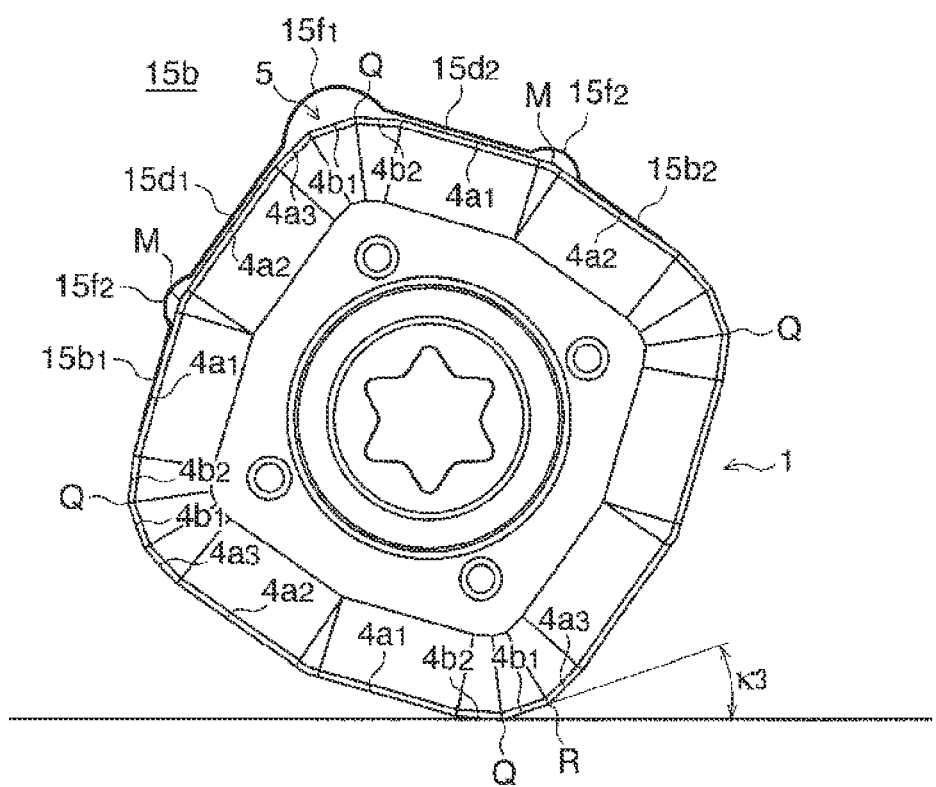
FIG. 14(b) is a view schematically showing the positional relation between the side surface portions of the cutting insert and the constraining wall surface of the insert seat of the finish-cutting tool body in the case of two-plane constraint, in which the side surface portions are in contact with the constraining wall surface.

FIGS. 14(*a*) and 14(*b*) show the positional relation between the constraining wall surface 15*b* and the side surface portions of the cutting insert 1 coming into contact therewith. Numbers attached to the side surface portions of the cutting insert 1 follow the numbers of the side surface portions shown in FIGS. 11(*a*) and 11(*b*). Accordingly, the side surface portions of the cutting insert 1 coming into contact with the constraining wall surface 15*b* comprise a sixth side surface portion 4*a*1, a seventh side surface portion 4*a*2, an eighth side surface portion 4*a*3, a ninth side surface portion 4*b*1, a tenth side surface portion 4*b*2, an eleventh side surface portion 4*a*1, and a twelfth side surface portion 4*a*2 clockwise from the left side in the figure. When the cutting insert 1 is fixed to the insert seat 15*a*, the sixth side surface portion 4*a*1 abuts the constraining wall surface portion 15*b*1, the seventh side surface portion 4*a*2 opposes the free wall surface portion 15*d*1, the eleventh side surface portion 4*a*1 opposes the free wall surface portion 15*d*2, and the twelfth side surface portion 4*a*2 abuts the constraining wall surface portion 15*b*2.

An angle between the constraining wall surface portion 15*b*1 and the free wall surface portion 15*d*1, and an angle between the constraining wall surface portion 15*b*2 and the free wall surface portion 15*d*2 are both equal to or substantially equal to the above crossing angle β.

The width (length in parallel to the insert seat surface 15*c*) of the constraining wall surface portions 15*b*1, 15*b*2 and the free wall surface portions 15*d*1, 15*d*2 is preferably about ¾ of the length of the first cutting edge portion 7*a*1 and the second cutting edge portion 7*a*2.

A corner portion 5 constituted by the eighth side surface portion 4*a*3, the ninth side surface portion 4*b*1 and the tenth side surface portion 4*b*2 enters a large groove 15*f*1, a corner portion at a middle point M of the sixth side surface portion 4*a*1 and the seventh side surface portion 4*a*2 and a corner portion at a middle point M of the eleventh side surface portion 4*a*1 and the twelfth side surface portion 4*a*2 enter large grooves 15*f*2. Accordingly, the corner portion 5 and the corner portions at middle points M are not in contact with the constraining wall surface 15*b*.

The abutting of the sixth side surface portion 4*a*1 and the twelfth side surface portion 4*a*2 of the cutting insert 1 to the constraining wall surface portions 15*b*1 and 15*b*2 prevents the rotation (displacement) of the cutting insert 1 by a cutting load. There is preferably a gap of about 0.05 mm at maximum between the seventh side surface portion 4*a*2 and the eleventh side surface portion 4*a*1 and the free wall surface portions 15*d*1 and 15*d*2 in the cutting insert 1.

By a low step 15*e* surrounding the insert seat surface 15*c*, the annular cutting edge 6 and the inclined annular surface portion 9 of the cutting insert 1 attached to the insert seat 15*a* are not in contact with the seat surface 15*c*. Accordingly, when the cutting insert 1 is fixed to the insert seat surface 15*c*, the annular cutting edge 6 is not damaged.

In the indexable rotary cutting tool of the present invention for finish cutting, the positions and inclination angles of the constraining wall surface 15*b* and the insert seat surface 15*c* are set such that any one of the connecting points Q of the cutting insert 1 is positioned at the lowest point in a direction of the rotation center axis O. With the connecting point Q of the main short-side cutting edge portion 8*a* and the auxiliary short-side cutting edge portion 8*b* in the short-side cutting edge portion 8 positioned at the lowest point, the main short-side cutting edge portion 8*a* located forward in a feed direction mainly contributes to cutting, while the auxiliary short-side cutting edge portion 8*b* located rearward in a feed direction functions to adjust the roughness of a surface cut by the main cutting edge portion 8*a*.

In the indexable rotary cutting tool of the present invention for finish cutting, it is preferable not only that any one of the connecting points Q of the cutting insert 1 is positioned at the lowest point in a direction of the rotation center axis O, but also that the main short-side cutting edge portion 8*a* connected to said connecting point Q has a predetermined inclination angle. A cutting edge angle κ3 expressing the inclination angle of this main short-side cutting edge portion 8*a* is an angle between a straight line connecting the point Q at the lowest point to the point R and a plane perpendicular to the rotation center axis O at the point Q. To conduct high-precision finishing, the cutting edge angle κ3 preferably meets the condition of $12° \le \kappa 3 \le 30°$.

Of course, the connecting points Q of all cutting inserts 1 at the lowest point are positioned on the same plane perpendicular to the rotation center axis O. As a result, the main short-side cutting edge portions 8*a* and auxiliary short-side cutting edge portions 8*b* of all cutting inserts 1 are uniformly brought into contact with a work for finish cutting, so that high-feed finish cutting can be conducted smoothly. Also, with chattering, etc. suppressed, it is possible to prevent chipping, breakage, etc. in the cutting edge of the cutting insert 1.

To position any one of the connecting points Q of the cutting insert 1 at the lowest point in a direction of the rotation center axis O, and to set the cutting edge angle κ3 of the main short-side cutting edge portion 8*a* at said connecting point Q in a predetermined range, the positions and inclination angles of the constraining wall surface 15*b* and the insert seat surface 15*c* are set in predetermined ranges. This may be conducted by a geometrical method shown, for example, in FIG. 15.

Figure 15:
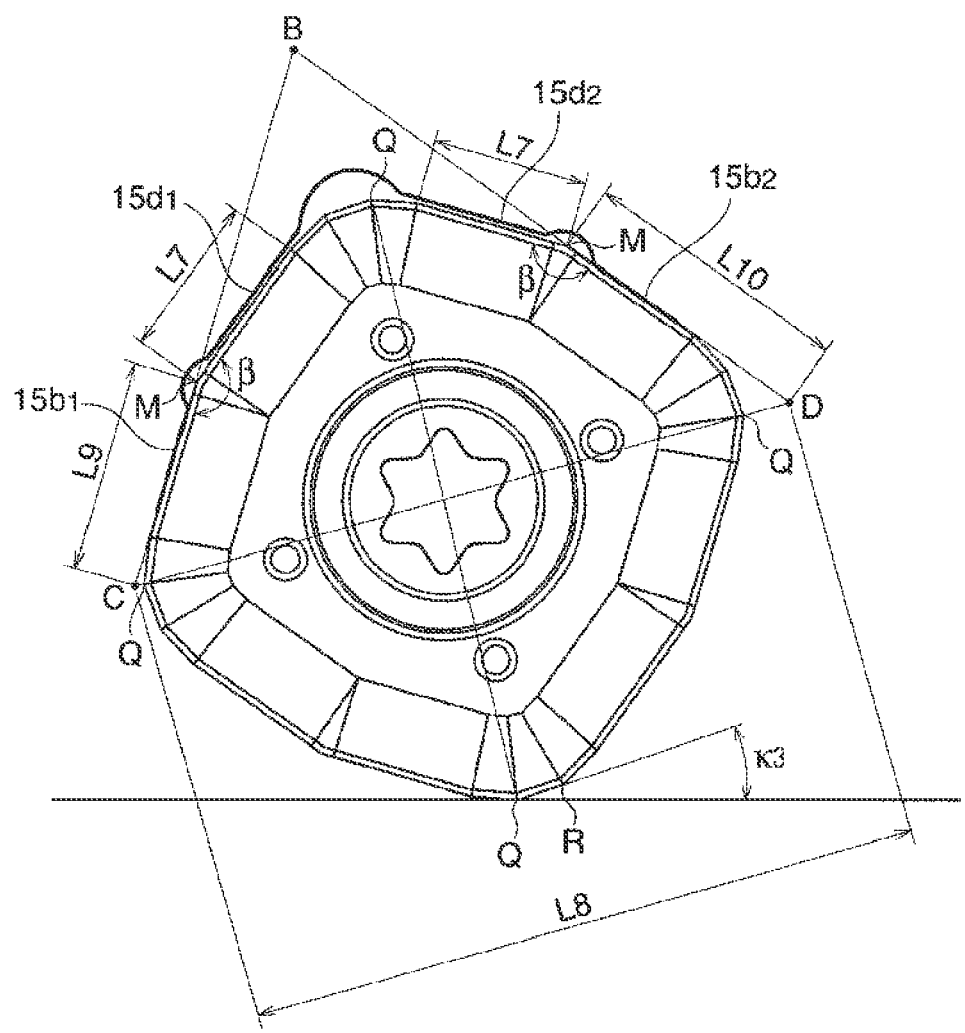
FIG. 15 is a schematic view showing a method for geometrically positioning the constraining wall surface of the insert seat of the finish-cutting tool body.

A triangle BCD shown in FIG. 15 is constituted by one line segment CD perpendicular to a straight line connecting the point Q positioned at the lowest point to the point Q positioned at the highest point (line segment connecting two points Q, Q adjacent to the point Q positioned at the lowest point), and two straight lines BC, BD tangent to the first and second cutting edge portions 7*a*1, 7*a*2 in the main long-side cutting edge portion 7*a* of the cutting insert 1. With the length L8 of the line segment CD, the length L9 of the line segment CM, the length L10 of the line segment DM, the length L7 of the first and second cutting edge portions 7*a*1, 7*a*2, and the crossing angle β of the first cutting edge portion 7*a*1 and the second cutting edge portion 7*a*2 introduced into the triangle BCD, the positions and inclination angles of the constraining wall surface 15*b* and the insert seat surface 15*c* are determined. Of course, the positioning of the constraining wall surface portions 15*b*1, 15*b*2 and the free wall surface portions 15*d*1, 15*d*2 is not restricted to this method.

As shown in FIG. 15, the inclination angles of the constraining wall surface portions 15*b*1, 15*b*2 and the free wall surface portions 15*d*1, 15*d*2 at the point Q positioned at the lowest point vary depending on the cutting edge angle κ3 of the main short-side cutting edge portion 8*a*. Accordingly, the inclination angles of the constraining wall surface portions 15*b*1, 15*b*2 and the free wall surface portions 15*d*1, 15*d*2 need only be changed depending on a desired cutting edge angle κ3.

As shown in FIG. 15, because the positions and inclination angles of the constraining wall surface portions 15*b*1, 15*b*2 and the free wall surface portions 15*d*1, 15*d*2 are determined by the shape of the cutting insert 1, when cutting inserts 1 having different shapes are used, the positions and inclination angles of the constraining wall surface portions 15*b*1, 15*b*2 and the free wall surface portions 15*d*1, 15*d*2 may be determined depending on their shapes.

With the support surface portion 11 on the upper or lower surface 2, 3 of the cutting insert 1 in close contact with the insert seat surface 15*c*, and with each side surface portion of the cutting insert 1 abutting the corresponding constraining wall surface portion 15*b*1, 15*b*2 of the constraining wall surface 15*b*, the screw 16 is inserted into the mounting hole 12 of the cutting insert 1, and threadably engages the threaded hole 19 of the insert seat surface 15*c* with a predetermined torque. As a result, the cutting insert 1 is firmly fixed to the insert seat 15*a* of the finish-cutting tool body 15, such that the connecting point Q is positioned at the lowest point in a direction of the rotation center axis O.

It is possible to confirm by an imaging apparatus having a camera with an image sensor such as CCD, etc. whether or not the connecting points Q of all cutting inserts 1 attached to the insert seat 15*a* are positioned at the lowest point of the indexable rotary cutting tool for finish cutting. The position of each cutting insert 1 attached to the insert seat 15*a* can be finely adjusted based on the measurement results of the connecting point Q, if necessary.

[3] Cutting Method

The cutting method of the present invention is characterized in conducting both rough cutting and finish cutting with one type of cutting inserts 1 having such a structure as to conduct rough cutting or finish cutting when attached to a rough-cutting tool body 14 or a finish-cutting tool body 15, thereby reducing a cost per one cutting insert 1. Accordingly, the entire cutting edge is divided to a rough-cutting edge portion comprising a main long-side cutting edge portion 7*a* and an auxiliary long-side cutting edge portion 7*b*, and a finish-cutting edge portion comprising a main short-side cutting edge portion 8*a* and an auxiliary short-side cutting edge portion 8*b*.

Because the square-shaped cutting insert 1 has four rough-cutting edge portions and four finish-cutting edge portions on one side, it has eight rough-cutting edge portions and eight finish-cutting edge portions in total. Because the rough-cutting edge portions and the finish-cutting edge portions are alternately arranged in the entire cutting edge of the cutting insert 1 without overlap, the entire cutting edge of the cutting insert 1 can be used surely.

For example, when the cutting inserts 1 are attached to the rough-cutting tool body 14 to carry out rough cutting, (a) rough cutting is carried out by the long-side cutting edge portion 7*a* of each cutting insert 1 attached to the rough-cutting tool body 14, and it is judged at a predetermined rough-cutting time that the long-side cutting edge portion 7*a* has been worn, and (b) to use an unused long-side cutting edge portion 7*a*, each cutting insert 1 is reattached to the insert seat 14*a* with its orientation turned, such that a connecting point P of an unused long-side cutting edge portion 7*a* is positioned at the lowest point of the indexable rotary cutting tool (change of the cutting edge). For example, when the rough-cutting tool body 14 has four insert seats 14*a*, the change of cutting edges is preferably conducted for all cutting inserts 1 attached to four insert seats 14*a*, to prevent the unevenness of rough-cutting accuracy, and increase rough-cutting efficiency and reattaching efficiency. The above operation is similarly conducted for finish cutting.

One example of finish-cutting procedures of a work, which is already roughly cut by the cutting method of the present invention will be explained below. This cutting method comprises the following steps 1-6.

Step 1

First, an indexable rotary cutting tool for rough cutting comprising a rough-cutting tool body 14, to which the cutting inserts 1 of the present invention are attached, and an indexable rotary cutting tool for finish cutting comprising a finish-cutting tool body 15, to which the cutting inserts 1 of the present invention are attached, are prepared.

Figure 16:
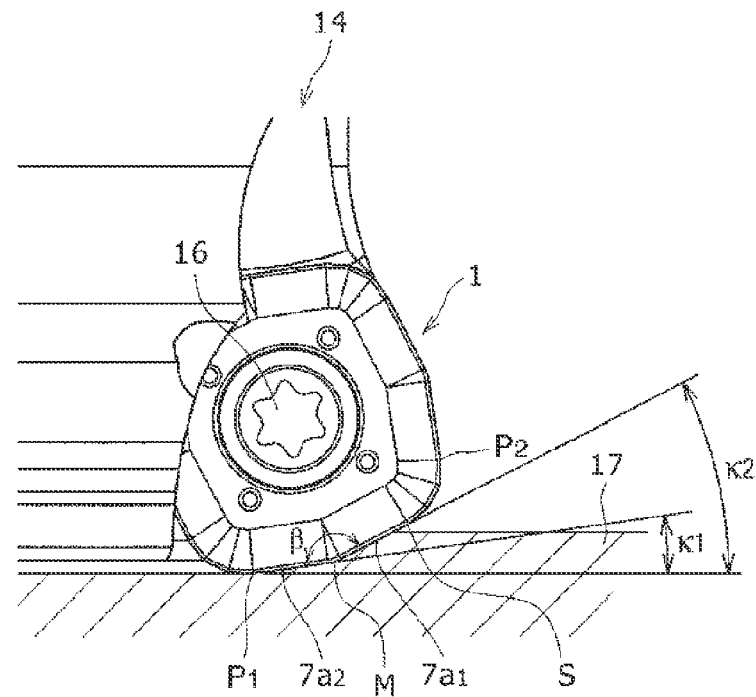
FIG. 16 is a partial enlarged view showing rough cutting using the indexable rotary cutting tool of FIG. 9 for rough cutting.

FIG. 16 shows the rough cutting of a work 17 with the cutting inserts 1 attached to the rough-cutting tool body 14. One connecting point P1 of the cutting insert 1 fixed to the insert seat 14*a* of the rough-cutting tool body 14 is positioned at the lowest point of the rough-cutting tool body 14 in a direction of the rotation center axis O, and another connecting point P2 of the cutting insert 1 is positioned at the outermost point (the farthest point from the rotation center axis O). In the example shown in FIG. 16, the first and second cutting edge portions 7*a*1, 7*a*2 constituting the main long-side cutting edge portion 7*a* are used as a main cutting edge portion for rough cutting.

Figure 17:
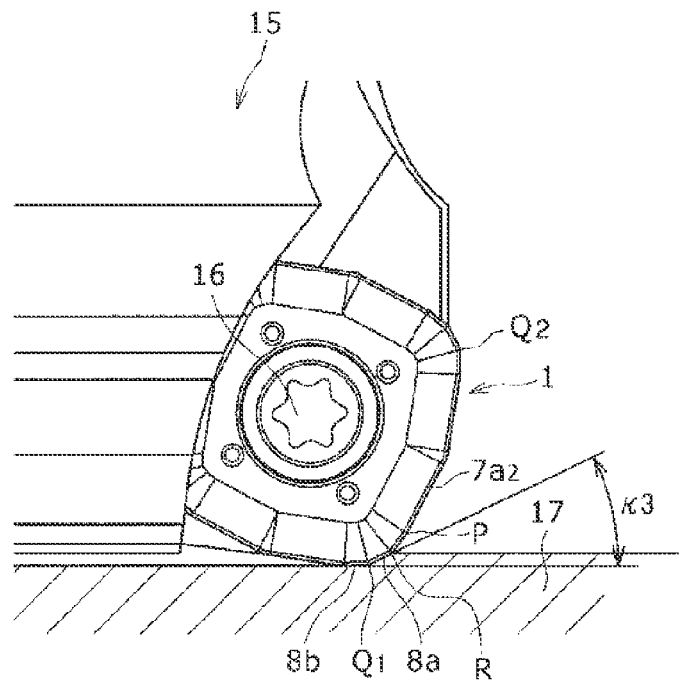
FIG. 17 is a partial enlarged view showing finish cutting using the indexable rotary cutting tool of FIG. 10 for finish cutting.

FIG. 17 shows the finish cutting of a work 17 with the cutting inserts 1 attached to the finish-cutting tool body 15. One connecting point Q1 of the cutting insert 1 fixed to the insert seat 15*a* of the finish-cutting tool body 15 is positioned at the lowest point of the finish-cutting tool body 15 in a direction of the rotation center axis O, and another connecting point Q2 of the cutting insert 1 is positioned at the outermost point (the farthest point from the rotation center axis O).

Step 2

The indexable rotary cutting tool for rough cutting is attached to a cutting machine such as a 3- or 5-axis, NC-controlled machining center, etc., to conduct the rough cutting of a work.

Step 3

When a predetermined rough-cutting time has passed, it is judged that the cutting edge portion of each cutting insert 1 has been worn, and to use another unused long-side cutting edge portion 7*a* (the first and second cutting edge portions 7*a*1, 7*a*2), each cutting insert 1 is reattached to the insert seat 14*a* with its orientation turned, such that the connecting point P of the unused main long-side cutting edge portion 7*a* and the auxiliary long-side cutting edge portion 7*b* is positioned at the lowest point of the indexable rotary cutting tool for rough cutting (first reattachment after changing the rough-cutting edge portion). The first reattachment after changing the rough-cutting edge portion is conducted for all cutting inserts 1 attached to the insert seats 14*a*. After all long-side cutting edge portions 7 for rough cutting on the upper surface 2 are used, all cutting inserts 1 are turned upside down and reattached to the insert seats 14*a* (second reattachment after changing the rough-cutting edge portion).

Step 4

The indexable rotary cutting tool for finish cutting is attached to the machining center, to carry out the finish cutting of the work roughly cut in the step 2. The machining center used for finish cutting may be different from that used for rough cutting. When a predetermined finish cutting time has passed, it is judged that the cutting edge portion of each cutting insert 1 has been worn, and to use another unused short-side cutting edge portion 8 (the main short-side cutting edge portion 8*a* and the auxiliary short-side cutting edge portion 8*b*), each cutting insert 1 is reattached to the insert seat 15*a* with its orientation turned, such that the connecting point Q of the unused main short-side cutting edge portion 8a and the auxiliary short-side cutting edge portion 8b is positioned at the lowest point of the indexable rotary cutting tool for finish cutting (first reattachment after changing the finish-cutting edge portion). The first reattachment after changing the finish-cutting edge portion is conducted for all cutting inserts 1 attached to the insert seats 15a. After all short-side cutting edge portions 8 for finish cutting on the upper surface 2 are used, all cutting inserts 1 are turned upside down and reattached to the insert seats 15a (second reattachment after changing the finish-cutting edge portion).

Step 5

When it is judged that all rough-cutting edge portions of the cutting inserts 1 attached to the indexable rotary cutting tool for rough cutting in the step 3 have been worn, they are changed to new cutting inserts 1. By first attaching the cutting inserts 1, whose finish-cutting edge portions are judged to have been worn in the step 4, as new cutting inserts 1, all cutting edges of each cutting insert 1 can be used surely.

Step 6

When it is judged that all finish-cutting edge portions of the cutting inserts 1 attached to the indexable rotary cutting tool for finish cutting in the step 4 have been worn, they are changed to new cutting inserts 1. By first attaching the cutting inserts 1, whose rough-cutting edge portions are judged to have been worn in the step 3, as new cutting inserts 1, all cutting edge portions of each cutting insert 1 can be used surely.

With cutting inserts 1 successively attached to the rough-cutting tool body 14 and the finish-cutting tool body 15 according to the above steps 1-6, both rough cutting and finish cutting can be conducted by one type of cutting inserts, resulting in a reduced cutting cost per one cutting insert.

The above cutting steps represent an example, and may be modified properly. Also, with used and unused cutting edge portions properly handled, and with works properly sent to the rough cutting step and the finish cutting step, etc., rough cutting and finish cutting can be conducted efficiently even if the rough-cutting tool body 14 and the finish-cutting tool body 15 are different. For example, after pluralities of works 17a, 17b, . . . are successively rough-cut, finish cutting can be successively conducted with high efficiency.

The present invention will be explained in more detail referring to Examples below without intention of restricting the scope of the present invention.

EXAMPLE 1

The cutting insert 1 of the present invention having the specification shown in Table 1 was produced by cemented carbide. Table 1 shows the length L1 of the main long-side cutting edge portion 7a, the length L2 of the auxiliary long-side cutting edge portion 7b, the length L3 of the main short-side cutting edge portion 8a, the length L4 of the auxiliary short-side cutting edge portion 8b, the angle $\lambda 1$ between the second cutting edge portion 7a2 and the auxiliary long-side cutting edge portion 7b adjacent to each other, the angle $\lambda 2$ between the auxiliary long-side cutting edge portion 7b and the main short-side cutting edge portion 8a adjacent to each other, the angle $\lambda 3$ between the main short-side cutting edge portion 8a and the auxiliary short-side cutting edge portion 8b adjacent to each other, the angle $\lambda 4$ between the auxiliary short-side cutting edge portion 8b and the first cutting edge portion 7a1 adjacent to each other, the inclination angles $\alpha 1$, $\alpha 2$ of the inclined annular surface portion 9, and the crossing angle $\beta$ of the first cutting edge portion 7a1 and the second cutting edge portion 7a2 constituting the main long-side cutting edge portion 7a. As is clear from Table 1, L1 and L3 meet the conditions of L1>L3 and L1/L3=5.0.

TABLE 1

| Length of Cutting Edge Portion (mm) | | | | Angle (°) | | | | | | |
|---|---|---|---|---|---|---|---|---|---|---|
| L1 | L2 | L3 | L4 | $\lambda 1$ | $\lambda 2$ | $\lambda 3$ | $\lambda 4$ | $\alpha 1$ | $\alpha 2$ | $\beta$ |
| 10.0 | 2.0 | 2.0 | 2.0 | 10 | 26 | 24 | 10 | 9 | 19 | 160 |

Because there is a larger cutting load in rough cutting than in finish cutting, a work was first finish-cut and then rough-cut to examine the influence of rough cutting on a finish-cutting edge portion.

The above cutting inserts 1 were attached with a connecting point Q positioned at the lowest point, to each of insert seats 15a of the finish-cutting tool body 15 shown in FIGS. 7 and 8(b), which had four insert seats 15a, and an outer diameter of 63 mm in a portion to which the cutting inserts 1 were attached. Each cutting insert 1 attached had an axial rake angle of −6°, and a radial rake angle of −10°. The resultant indexable rotary cutting tool was mounted to a vertical machining center with a BT50 main spindle (the maximum power of the main spindle: 15 kW), to carry out finish cutting under the following conditions.

Cutting mode: Face mill cutting,
Work: Carbon steel S50C,
Cutting speed (Vc): 200 m/min,
Feed per one blade (fz): 0.1 mm/blade,
Axial cutting depth (ap): 0.1 mm,
Radial cutting depth (ae): 37.8 mm, and
Cutting method: Dry cutting.

The cutting insert 1 used for finish cutting was attached to each insert seat 14a of the rough-cutting tool body 14 shown in FIGS. 6 and 8(a), which had four insert seats 14a, and an outer diameter of 63 mm in a portion to which the cutting inserts 1 were attached, such that the connecting point P of the auxiliary long-side cutting edge portion 7b adjacent to the main short-side cutting edge portion 8a used for finish cutting and the main long-side cutting edge portion 7a constituted by the second cutting edge portion 7a2 and the first cutting edge portion 7a1 was positioned at the lowest point. As a result, the auxiliary long-side cutting edge portion 7b adjacent to the main short-side cutting edge portion 8a used for finish cutting, and the main long-side cutting edge portion 7a adjacent to the auxiliary long-side cutting edge portion 7b via a connecting point P were used for rough cutting. Each cutting insert 1 attached had an axial rake angle of −6°, and a radial rake angle of −15°.

The resultant indexable rotary cutting tool for rough cutting was attached to a vertical machining center with a BT50 main spindle (maximum power of the main spindle: 15 kW), to carry out rough cutting under the following conditions. Rough cutting was terminated when the rough cutting distance reached 25 m, to observe the wear, damage, etc. of the cutting edge portions by an optical microscope (magnification: 60 times).

Cutting mode: Face mill cutting,
Work: Carbon steel S50C,
Cutting speed (Vc): 163 m/min,
Feed per one blade (fz): 2.2 mm/blade,
Axial cutting depth (ap): 2.0 mm,
Radial cutting depth (ae): 45.0 mm, and Cutting method: Dry cutting.

After finish cutting, and after both finish cutting and rough cutting, the wear and damage of each cutting edge portion were observed. (1) Observation after finish cutting revealed that there were no wear and damage in other cutting edge portions adjacent to the cutting edge portions used for finish cutting, and (2) observation after rough cutting revealed that there were no wear and damage in other cutting edge portions adjacent to the cutting edge portions used for rough cutting. It is clear from the above results (1) and (2) that (a) even if both rough cutting and finish cutting are carried out by one type of cutting inserts of the present invention, other cutting edge portions do not suffer wear, damage, etc., and that therefore, (b) with both upper and lower surfaces 2, 3 of the negative cutting insert of the present invention, eight cutting edge portions can be used for rough cutting, and eight cutting edge portions can be used for finish cutting.

EXAMPLE 2

Using an indexable rotary cutting tool for rough cutting, which comprised a rough-cutting tool body 14, to which the cutting inserts 1 of the present invention were attached, rough milling was conducted to a work of FCD400 (spheroidal graphite cast iron) for 130 minutes in total, while measuring the wear depth (VBmax) of a flank of a long-side cutting edge portion 7 (cutting edge portion used for rough cutting) at periodic rough-cutting intervals. Also, the influence of rough cutting on a long-side cutting edge portion 7 not used for rough cutting, and the main short-side cutting edge portion 8a and the auxiliary short-side cutting edge portion 7b for finish cutting was observed by an optical microscope (magnification: 60 times). The same indexable rotary cutting tool and machining center as in Example 1 were used for rough cutting. The rough cutting conditions in Example 2 were as follows.

Work: FCD400,
Cutting speed (Vc): 184 m/min,
Feed per one blade (fz): 1.5 mm/blade,
Axial cutting depth (ap): 1.0 mm,
Radial cutting depth (ae): 40 mm, and
Cutting method: Dry cutting (air blowing).

Figure 18:
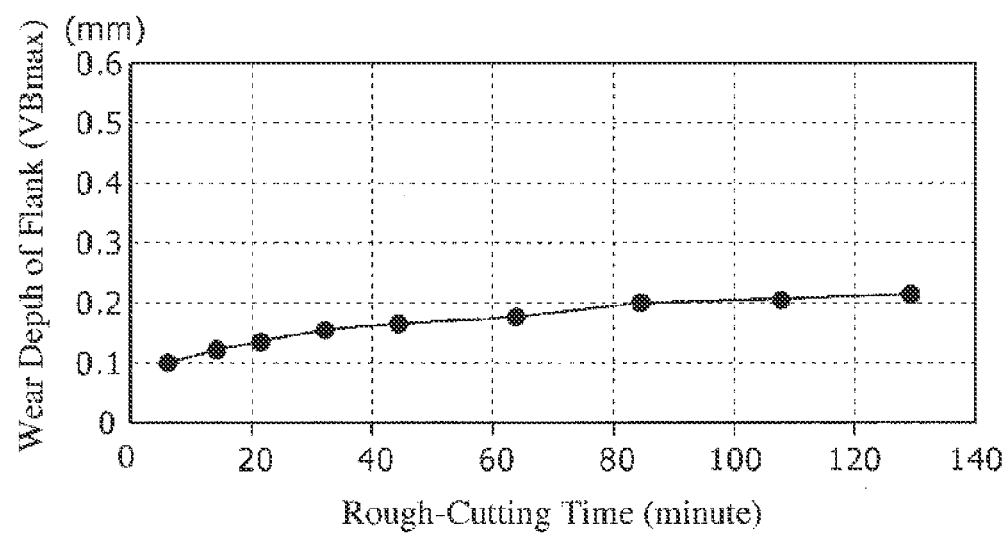
FIG. 18 is a graph showing the relation between rough-cutting time and the wear depth of a flank of a long-side cutting edge portion in Example 2.
Figure 19:
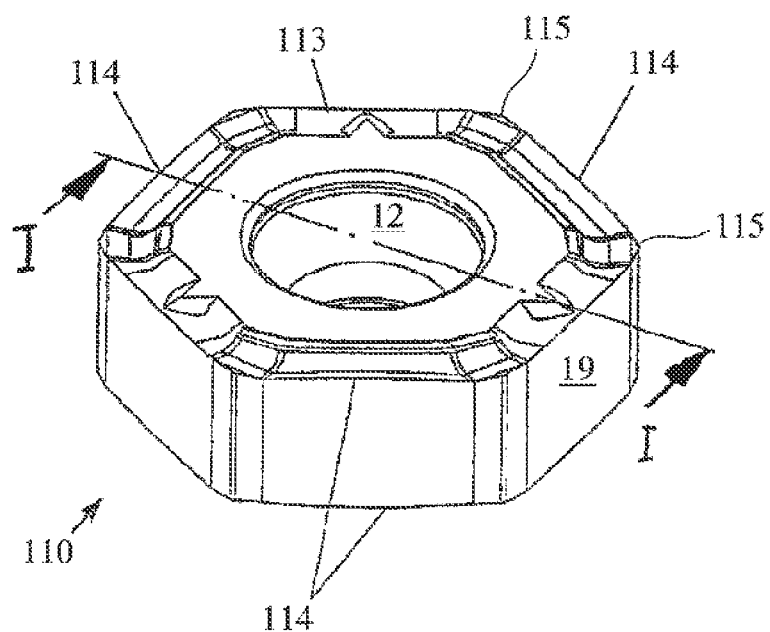
FIG. 19 is a perspective view showing the cutting insert disclosed in JP 2000-503912 A.
Figure 20:
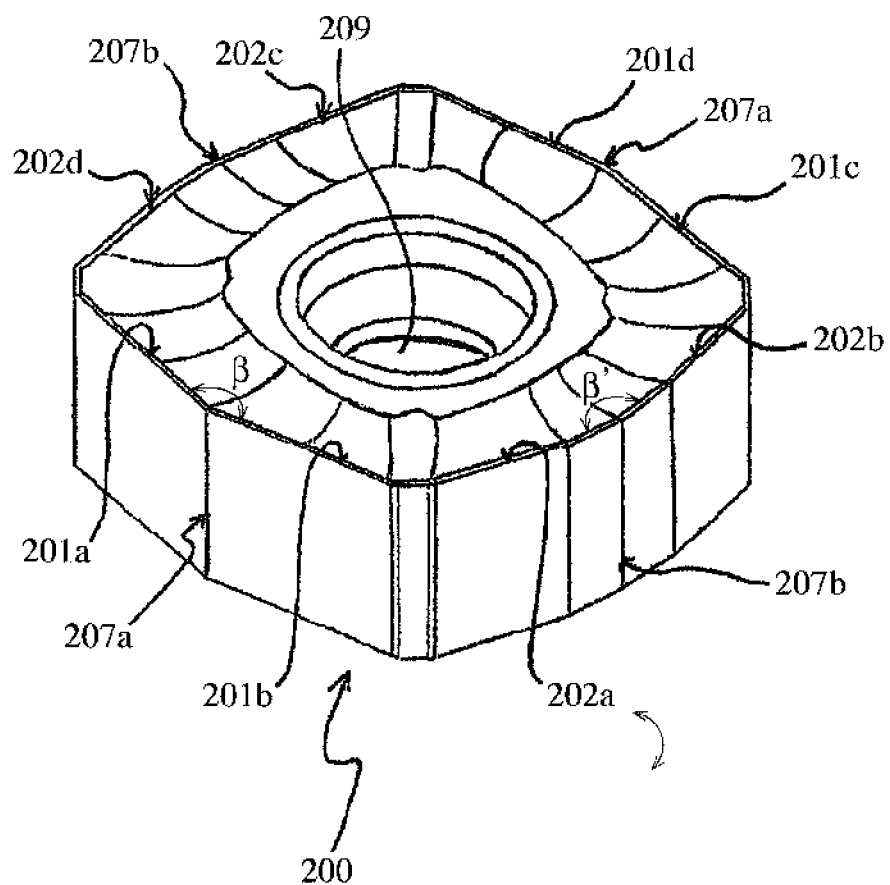
FIG. 20 is a perspective view showing the face-milling insert disclosed in U.S. Pat. No. 7,410,332.

As is clear from FIG. 18 showing the relation between the rough-cutting time and the wear depth (VBmax) of the flank of the long-side cutting edge portion 7, the wear depth (VBmax) of the flank of the long-side cutting edge portion 7 for rough cutting in the cutting insert 1 of the present invention was within 0.2 mm until the rough-cutting time of 120 minutes. Because the permissible upper limit of the wear depth (VBmax) of a flank of a cutting edge portion in a cutting insert is generally 0.2 mm, it was confirmed that rough cutting could be conducted within a normal wear range until 120 minutes. Accordingly, with one cutting insert of the present invention having eight long-side cutting edge portions 7 for rough cutting in total on both upper and lower surfaces 2, 3, it is estimated that rough cutting can be conducted to a work of FCD400 for 120 minutes×8=960 minutes.

As a result of examining the influence of rough cutting on other long-side cutting edge portions 7 not used for rough cutting, and the main short-side cutting edge portions 8a and the auxiliary short-side cutting edge portions 7b for finish cutting, no wear was observed in the flanks of these cutting edge portions.

EFFECT OF THE INVENTION

Because the negative cutting insert of the present invention has four rough-cutting edge portions and four finish-cutting edge portions on each surface, it can be attached to a rough-cutting tool body and a finish-cutting tool body to conduct rough cutting and finish cutting to a work, resulting in a reduced use cost per one cutting insert. Also, because all rough-cutting edge portions and finish-cutting edge portions of the cutting inserts can be used by reattaching cutting inserts used for rough cutting to a finish-cutting tool body, or by reattaching cutting inserts used for finish cutting to a rough-cutting tool body, a use cost per one cutting insert can be further reduced.

With longer rough-cutting edge portions than finish-cutting edge portions, rough cutting can be conducted efficiently, with improved accuracy of finish-cut surfaces.

Because a combination of the cutting inserts of the present invention with a rough-cutting tool body and a finish-cutting tool body enables both rough cutting and finish cutting, both rough cutting and finish cutting can be conducted with one type of cutting inserts without needing rough-cutting inserts and finish-cutting inserts separately. Accordingly, the production cost of cutting inserts is reduced.

The cutting insert, indexable rotary cutting tool and cutting method of the present invention having the above features are suitable for high-efficiency cutting of dies for molding metal products and synthetic resin products, various metal parts, etc.

DESCRIPTION OF REFERENCE NUMERALS

1: Cutting insert.
2: Upper surface.
3: Lower surface.
4: Side surface.
5: Corner portion.
6: Annular cutting edge.
7: Long-side cutting edge portion.
7a: Main long-side cutting edge portion.
7a1: First cutting edge portion.
7a2: Second cutting edge portion.
7b: Auxiliary long-side cutting edge portion.
8: Short-side cutting edge portion.
8a: Main short-side cutting edge portion.
8b: Auxiliary short-side cutting edge portion.
9: Inclined annular surface portion.
9a: First inclined surface (inclined rake face).
9b: Second inclined surface.
10: Side portion of side surface.
11: Support surface.
12: Insert-mounting hole.
13: Mark.
14: Rough-cutting tool body.
14a: Insert seat.
14b: Constraining wall surface.
14b1, 14b2: Constraining wall surface portion.
14c: Insert seat surface.
14d1, 14d2: Free wall surface portion.
14e: Step.
14f1: Large groove.
14f2: Small groove.
15: Finish-cutting tool body.
15a: Insert seat.
15b: Constraining wall surface.
15b1, 15b2: Constraining wall surface portion.
15c: Insert seat surface.
15d1, 15d2: Free wall surface portion.
15e: Step.
15f1: Large groove.
15f2: Small groove.

16: Insert-fixing screw.
17: Work.
18: Threaded hole in insert seat surface 14c.
19: Threaded hole in insert seat surface 15c.
M: Middle point of main long-side cutting edge portion (crossing point of first cutting edge portion and second cutting edge portion).
O: Rotation center axis.
P, Q, R, S: Connecting point.
α1: Inclination angle of first inclined annular surface portion to plane perpendicular to thickness direction of cutting insert.
α2: Inclination angle of second inclined annular surface portion to plane perpendicular to thickness direction of cutting insert.
β: Crossing angle of first cutting edge portion and second cutting edge portion.
λ1: Angle of second cutting edge portion and auxiliary long-side cutting edge portion adjacent to each other.
λ2: Angle of auxiliary long-side cutting edge portion and main short-side cutting edge portion adjacent to each other.
λ3: Angle of main short-side cutting edge portion and auxiliary short-side cutting edge portion adjacent to each other.
λ4: Angle of auxiliary short-side cutting edge portion and first cutting edge portion adjacent to each other.
κ1: Cutting edge angle of second cutting edge portion (inclination angle of second cutting edge portion to plane perpendicular to rotation center axis).
κ2: Cutting edge angle of first cutting edge portion (inclination angle of first cutting edge portion to plane perpendicular to rotation center axis).
κ3: Cutting edge angle of main short-side cutting edge portion (inclination angle of main short-side cutting edge portion to plane perpendicular to rotation center axis).

What is claimed is:

1. A negative cutting insert having a polygonal plate shape comprising upper and lower surfaces, and side surfaces extending between an edge of said upper surface and an edge of said lower surface;
   each of said upper surface and said lower surface having four side portions and four corner portions, as well as an annular cutting edge formed along the entire edge, an annular surface portion inclined inward from said annular cutting edge, and a support surface portion extending inside said inclined annular surface portion;
   a mounting hole penetrating from said upper surface to said lower surface being provided in said support surface portion;
   each annular cutting edge being constituted by four long-side cutting edge portions and four short-side cutting edge portions alternately connected;
   each long-side cutting edge portion being constituted by a main long-side cutting edge portion and an auxiliary long-side cutting edge portion connected via a point P;
   each short-side cutting edge portion being constituted by a main short-side cutting edge portion and an auxiliary short-side cutting edge portion connected via a point Q, said main short-side cutting edge portion being connected to said auxiliary long-side cutting edge portion via a point R;
   each of said main long-side cutting edge portions being located in said side portion;
   each of said auxiliary long-side cutting edge portions, said main short-side cutting edge portions and said auxiliary short-side cutting edge portions being located in said corner portion; and
   the length L1 of said main long-side cutting edge portion and the length L3 of said main short-side cutting edge portion meeting the condition of L1>L3,
   wherein said main long-side cutting edge portion is constituted by a first cutting edge portion and a second cutting edge portion crossing at a center in its length direction; wherein said second cutting edge portion is connected to said auxiliary long-side cutting edge portion via a point P; and wherein said first cutting edge portion and said second cutting edge portion have an obtuse crossing angle β, and
   wherein an angle λ1 between said second cutting edge portion and said auxiliary long-side cutting edge portion adjacent to each other meets the condition of $7° \leq \lambda 1 \leq 20°$.

2. The cutting insert according to claim 1, wherein the length L1 of said main long-side cutting edge portion and the length L3 of said main short-side cutting edge portion meet the condition of $3 \leq L1/L3 \leq 10$.

3. The cutting insert according to claim 1, wherein said crossing angle β meets the condition of $150° \leq \beta \leq 170°$.

4. The cutting insert according to claim 1, wherein an angle λ3 between said main short-side cutting edge portion and said auxiliary short-side cutting edge portion adjacent to each other meets the condition of $12° \leq \lambda 3 \leq 30°$.

5. The cutting insert according to claim 1, wherein said main long-side cutting edge portion is used as a rough-cutting edge portion, and said main short-side cutting edge portion is used as a finish-cutting edge portion, so that the entire annular cutting edge is used for rough cutting and finish cutting.

6. An indexable rotary cutting tool for rough cutting, which comprises a rough-cutting tool body comprising pluralities of insert seats, and the cutting insert recited in claim 1 which is detachably attached to each of said insert seats, with any one of the connecting points P of each cutting insert positioned at the lowest point of said tool body in a direction of a rotation center axis thereof, and with the connecting points P of all cutting inserts at the lowest point positioned on the same plane perpendicular to said rotation center axis.

7. An indexable rotary cutting tool for finish cutting, which comprises a finish-cutting tool body comprising pluralities of insert seats, and the cutting insert recited in claim 1, which is detachably attached to each of said insert seats, with any one of the connecting points Q of each cutting insert positioned at the lowest point of said tool body in a direction of a rotation center axis thereof, and with the connecting points Q of all cutting inserts at the lowest point positioned on the same plane perpendicular to said rotation center axis.

8. The indexable rotary cutting tool according to claim 6, wherein one of said side surfaces on both sides of each corner portion of said cutting insert has a side surface portion having said first cutting edge portion, which is adjacent to said corner portion, and a side surface portion having said second cutting edge portion; wherein the other of said side surfaces on both sides of each corner portion has a side surface portion having said second cutting edge portion, which is adjacent to said corner portion, and a side surface portion having said first cutting edge portion; wherein at least one of both side surface portions adjacent to said corner portion is in contact with a constraining wall surface of the insert seat of said tool body; and wherein both side surface portions adjacent to both side surface portions adjacent to said corner portion are in contact with constraining wall surfaces of the insert seat of said tool body, so that at least three side surface portions of said cutting insert on both sides of the corner portion abut said constraining wall surface portions.

9. The indexable rotary cutting tool according to claim 7, wherein one of said side surfaces on both sides of each corner portion of said cutting insert has a side surface portion having said first cutting edge portion, which is adjacent to said corner portion, and a side surface portion having said second cutting edge portion; wherein the other of said side surfaces on both sides of each corner portion has a side surface portion having said second cutting edge portion, which is adjacent to said corner portion, and a side surface portion having said first cutting edge portion; wherein at least one of both side surface portions adjacent to said corner portion is in contact with a constraining wall surface of the insert seat of said tool body; and wherein both side surface portions adjacent to both side surface portions adjacent to said corner portion are in contact with constraining wall surfaces of the insert seat of said tool body, so that at least three side surface portions of said cutting insert on both sides of the corner portion abut said constraining wall surface portions.

10. An indexable rotary cutting system usable for both rough cutting and finish cutting, which comprises
    a rough-cutting tool body comprising pluralities of insert seats,
    a finish-cutting tool body comprising pluralities of insert seats, and
    the cutting inserts recited in claim 1,
    the detachable attachment of said cutting inserts to the insert seats of said rough-cutting tool body enables rough cutting, with any one of the connecting points P of each cutting insert positioned at the lowest point of said rough-cutting tool body in a direction of the rotation center axis thereof, and with the connecting points P of all cutting inserts at the lowest point positioned on the same plane perpendicular to said rotation center axis; and
    the detachable attachment of said cutting inserts to the insert seats of said finish-cutting tool body enables finish cutting, with any one of the connecting points Q of each cutting insert positioned at the lowest point of said finish-cutting tool body in a direction of the rotation center axis thereof, and with the connecting points Q of all cutting inserts at the lowest point positioned on the same plane perpendicular to said rotation center axis.

11. A method for conducting rough cutting and finish cutting to a work, which comprises
    preparing a rough-cutting tool body comprising pluralities of insert seats, a finish-cutting tool body comprising pluralities of insert seats, and the cutting inserts recited in claim 1;
    detachably attaching said cutting inserts to the insert seats of said rough-cutting tool body, with any one of the connecting points P of each cutting insert positioned at the lowest point of said rough-cutting tool body in a direction of the rotation center axis thereof, and with the connecting points P of all cutting inserts at the lowest point positioned on the same plane perpendicular to said rotation center axis, thereby conducting the rough cutting of said work;
    detachably attaching said cutting inserts to the insert seats of said finish-cutting tool body, with any one of the connecting points Q of each cutting insert positioned at the lowest point of said finish-cutting tool body in a direction of the rotation center axis thereof, and with the connecting points Q of all cutting inserts at the lowest point positioned on the same plane perpendicular to said rotation center axis, thereby conducting the finish cutting of said work; and
    reattaching the cutting inserts used for rough cutting to the insert seats of said finish-cutting tool body to conduct finish cutting, and/or reattaching the cutting inserts used for finish cutting to the insert seats of said rough-cutting tool body to conduct rough cutting.

* * * * *